United States Patent
Boudville

(10) Patent No.: US 9,838,458 B2
(45) Date of Patent: Dec. 5, 2017

(54) COOKIES AND ANTI-AD BLOCKER USING DEEP LINKS IN MOBILE APPS

(71) Applicant: Wesley John Boudville, Los Angeles, CA (US)

(72) Inventor: Wesley John Boudville, Los Angeles, CA (US)

( * ) Notice: Subject to any disclaimer, the term of this patent is extended or adjusted under 35 U.S.C. 154(b) by 305 days.

(21) Appl. No.: 14/545,694

(22) Filed: Jun. 8, 2015

(65) Prior Publication Data

US 2016/0359945 A1    Dec. 8, 2016

(51) Int. Cl.
*H04L 29/08* (2006.01)
*G06F 9/445* (2006.01)
*H04L 29/06* (2006.01)
*H04L 29/14* (2006.01)

(52) U.S. Cl.
CPC ............ *H04L 67/02* (2013.01); *G06F 8/61* (2013.01); *H04L 67/04* (2013.01); *H04L 67/125* (2013.01); *H04L 67/38* (2013.01); *H04L 69/18* (2013.01); *H04L 69/40* (2013.01)

(58) Field of Classification Search
CPC ......... H04L 67/02; H04L 67/18; H04L 67/10; G06F 8/61; G06F 17/2235; G06F 17/30958
USPC ....................................................... 709/219
See application file for complete search history.

(56) References Cited

U.S. PATENT DOCUMENTS

| | | |
|---|---|---|
| 8,433,800 B2 | 4/2013 | Chor |
| 8,532,632 B2 | 9/2013 | Boudville |
| 2012/0323898 A1* | 12/2012 | Kumar .............. G06F 17/30899 707/723 |
| 2013/0110815 A1 | 5/2013 | Tankovich |
| 2014/0089413 A1 | 3/2014 | Evans |
| 2014/0098644 A1 | 11/2014 | Boudville |
| 2014/0349746 A1 | 11/2014 | Boudville |
| 2015/0113068 A1 | 4/2015 | Boudville |
| 2016/0148270 A1* | 5/2016 | Vigier ................ G06Q 30/0267 705/14.58 |

OTHER PUBLICATIONS

U.S. Appl. No. 14/544,763, filed Feb. 18, 2015, Boudville.

* cited by examiner

*Primary Examiner* — Tu Nguyen

(57) ABSTRACT

A deep link has an app identifier that specifies the app in an app store. It also has an address of an instance of the app on a device. Deep links can bypass an ad blocker. A first instance on a first device cannot get ads from an ad server, because the ads have links with domains in a blacklist. A second device gets a deep link with the address of the first device. The second device runs an instance that gets an ad and rewrites links to point to the second device. The ad goes to the first app instance. The ad blocker finds no bad links and lets the ad appear on the first device. If the user picks a link, a message goes to the second device, to relay to the ad server.

2 Claims, 14 Drawing Sheets

| | |
|---|---|
| URL | http://madcow.com/ape.html |
| Deep Link | madcow://10.20.30.40:2532 |

Figure 1

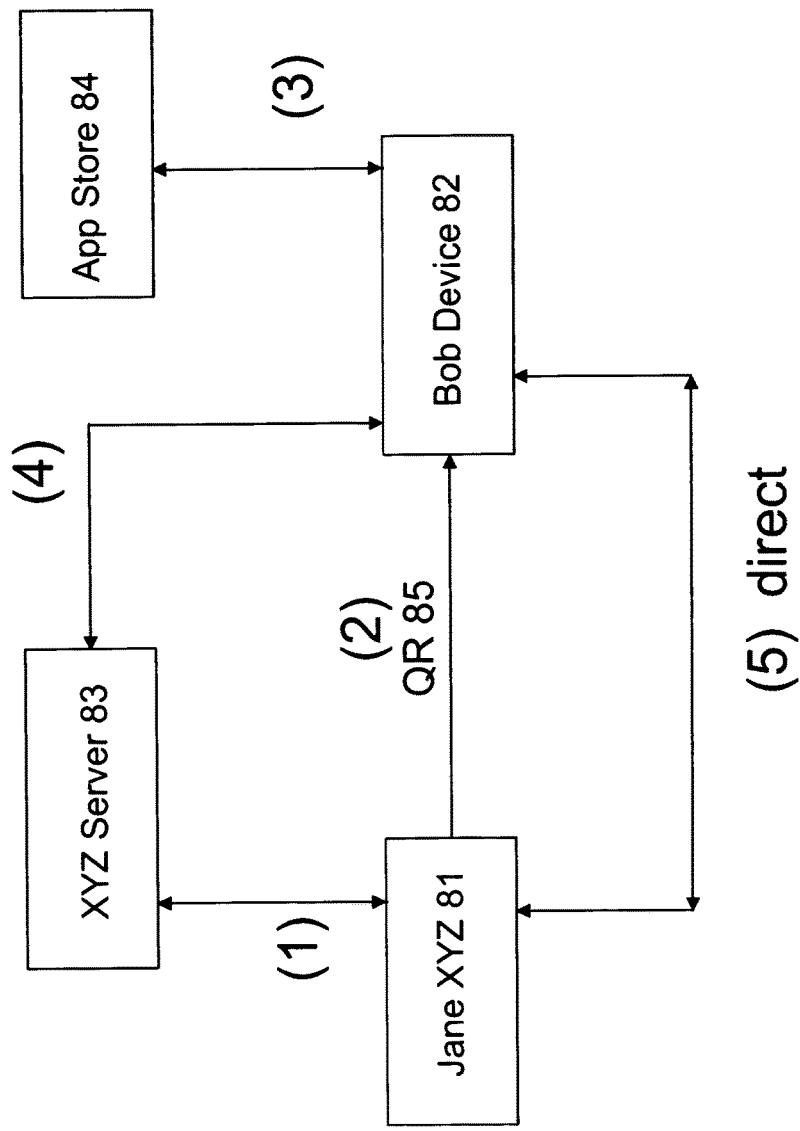
Figure 8 - "+ User"

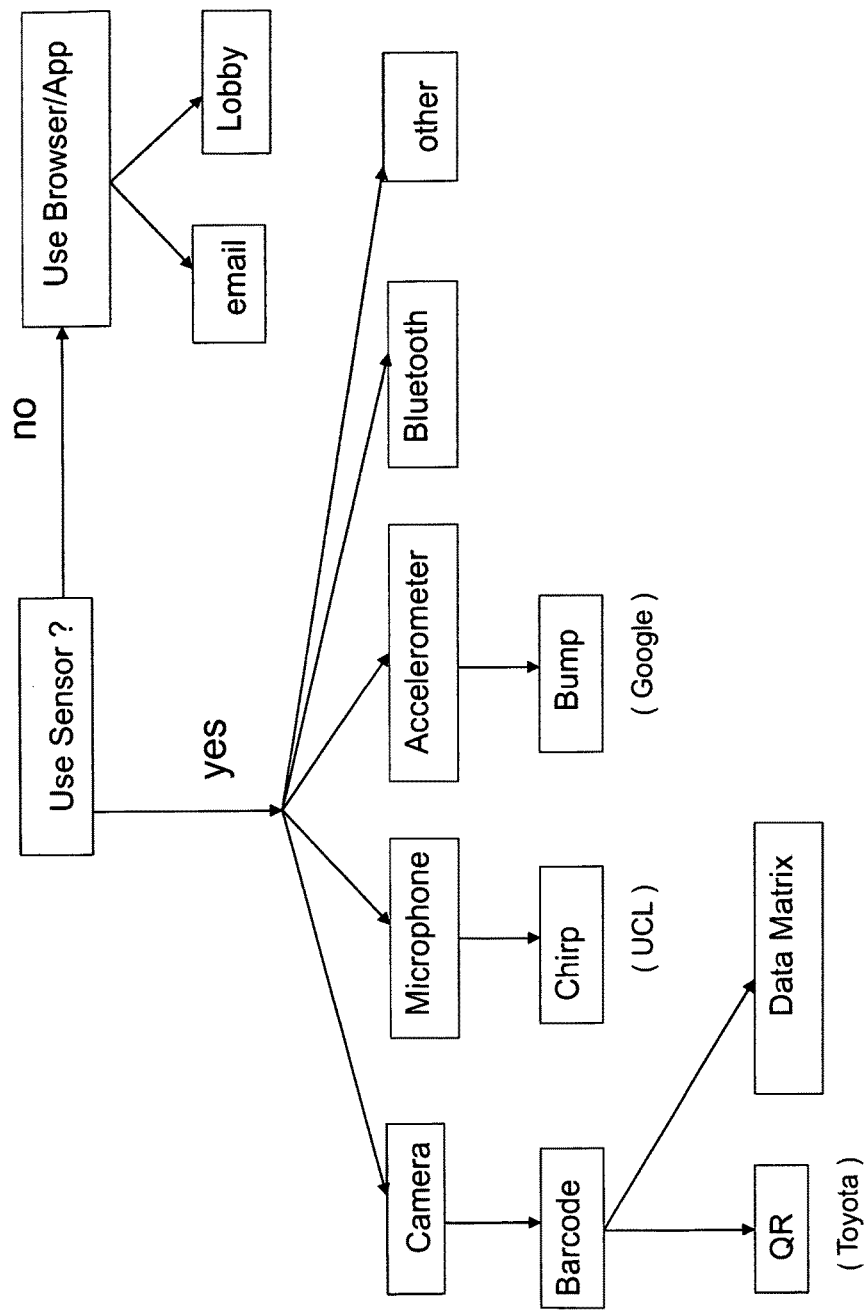
Figure 9 – How to get a Deep Link

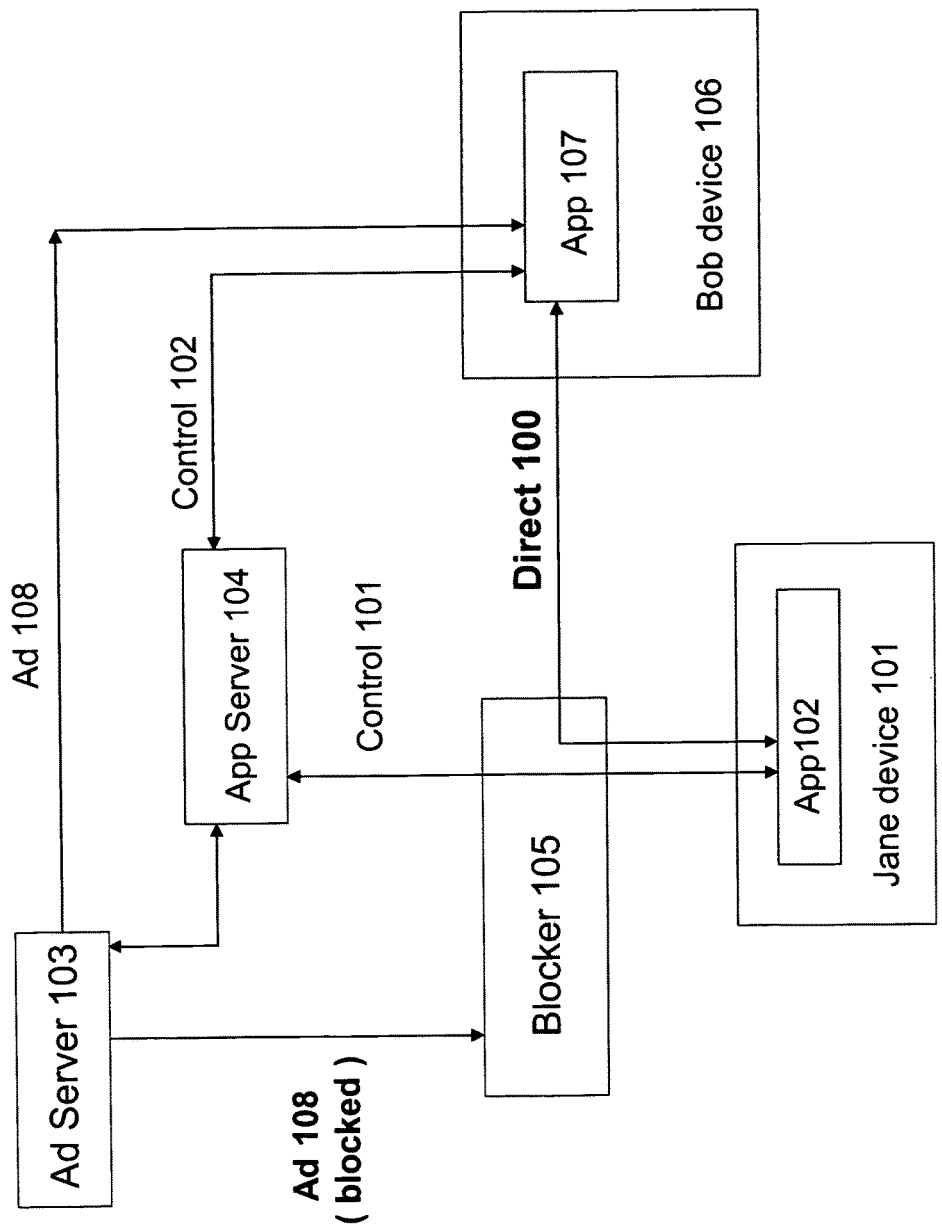
Figure 10 – Bypass Ad Blocker

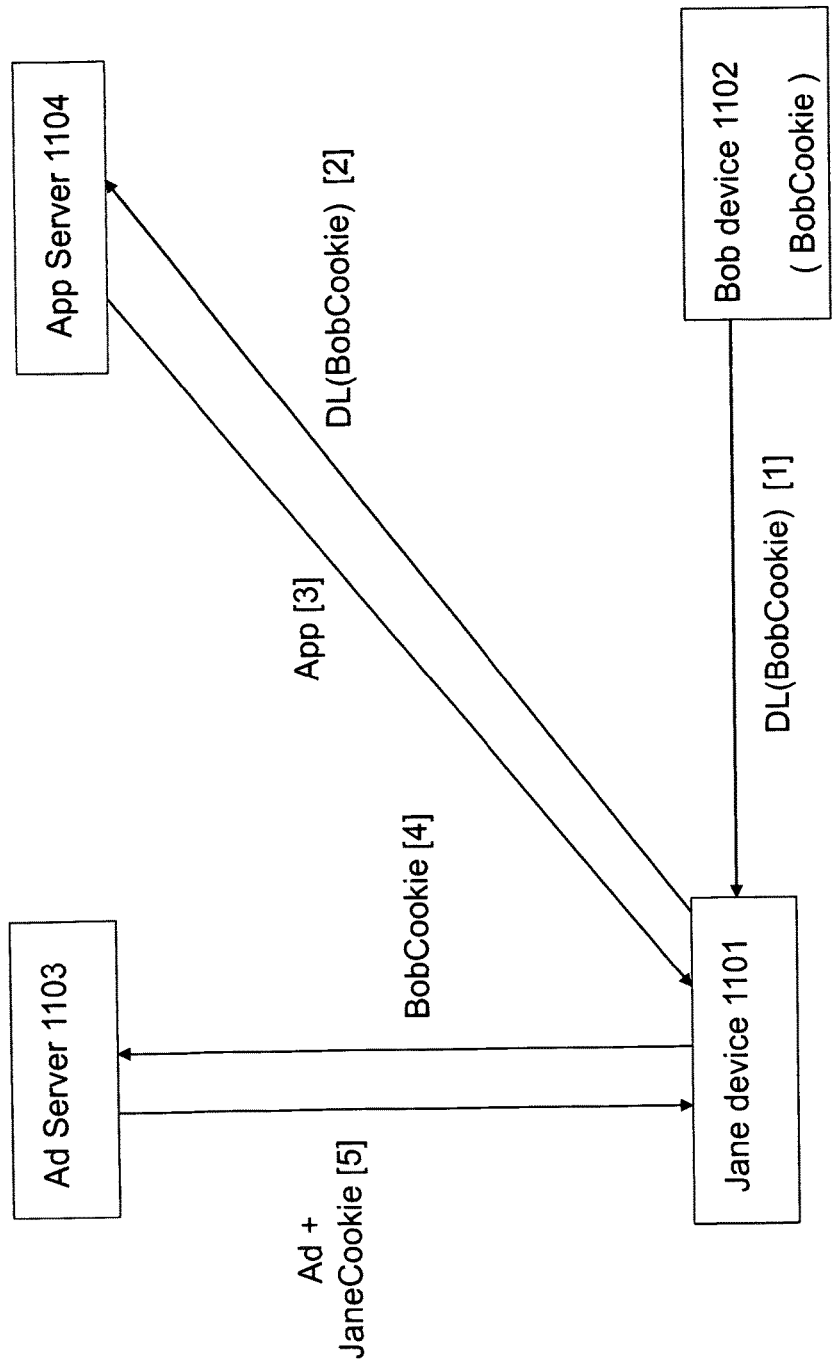
Figure 11 – Cookie for first time user Jane

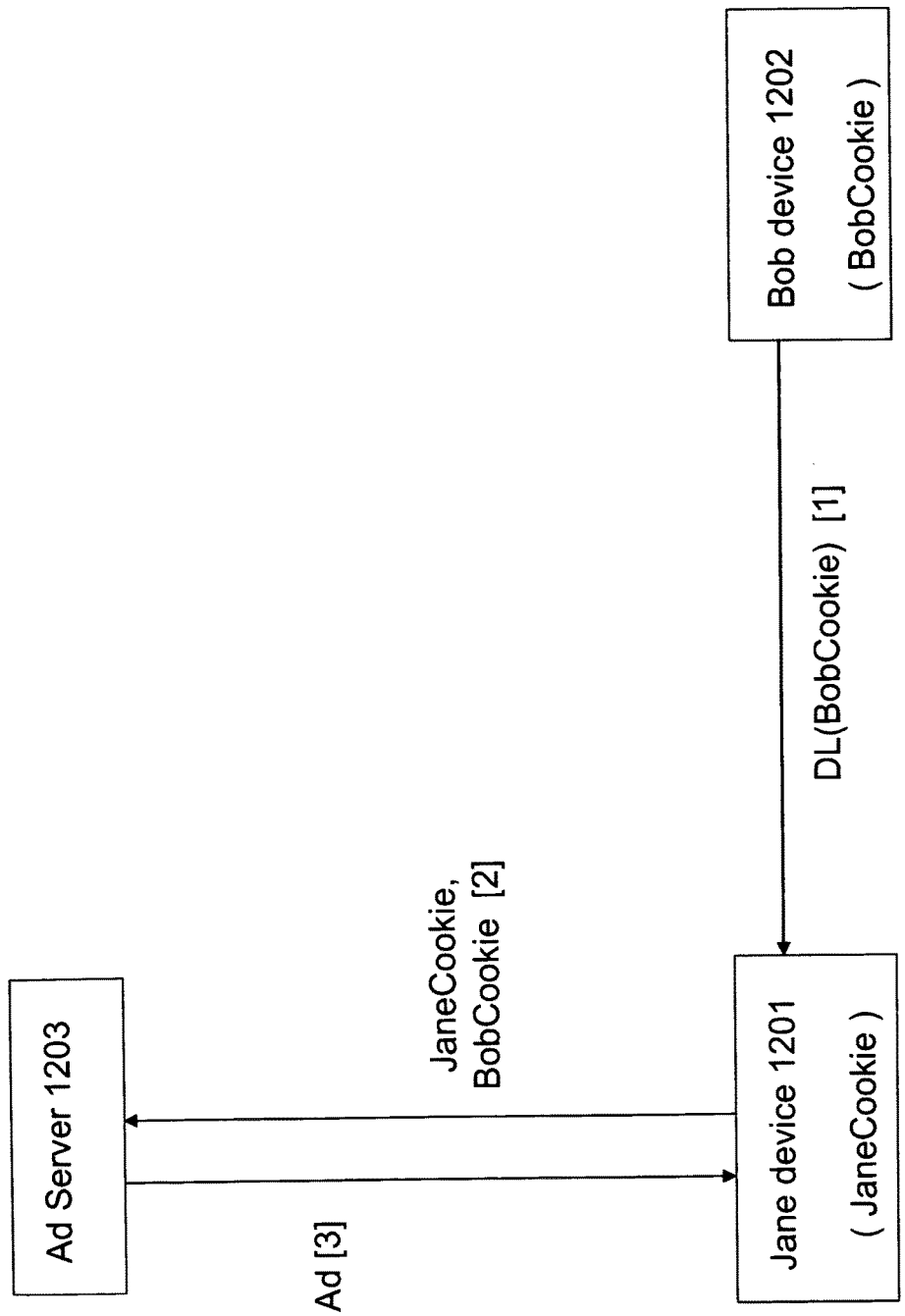
Figure 12 – Cookie for second time user

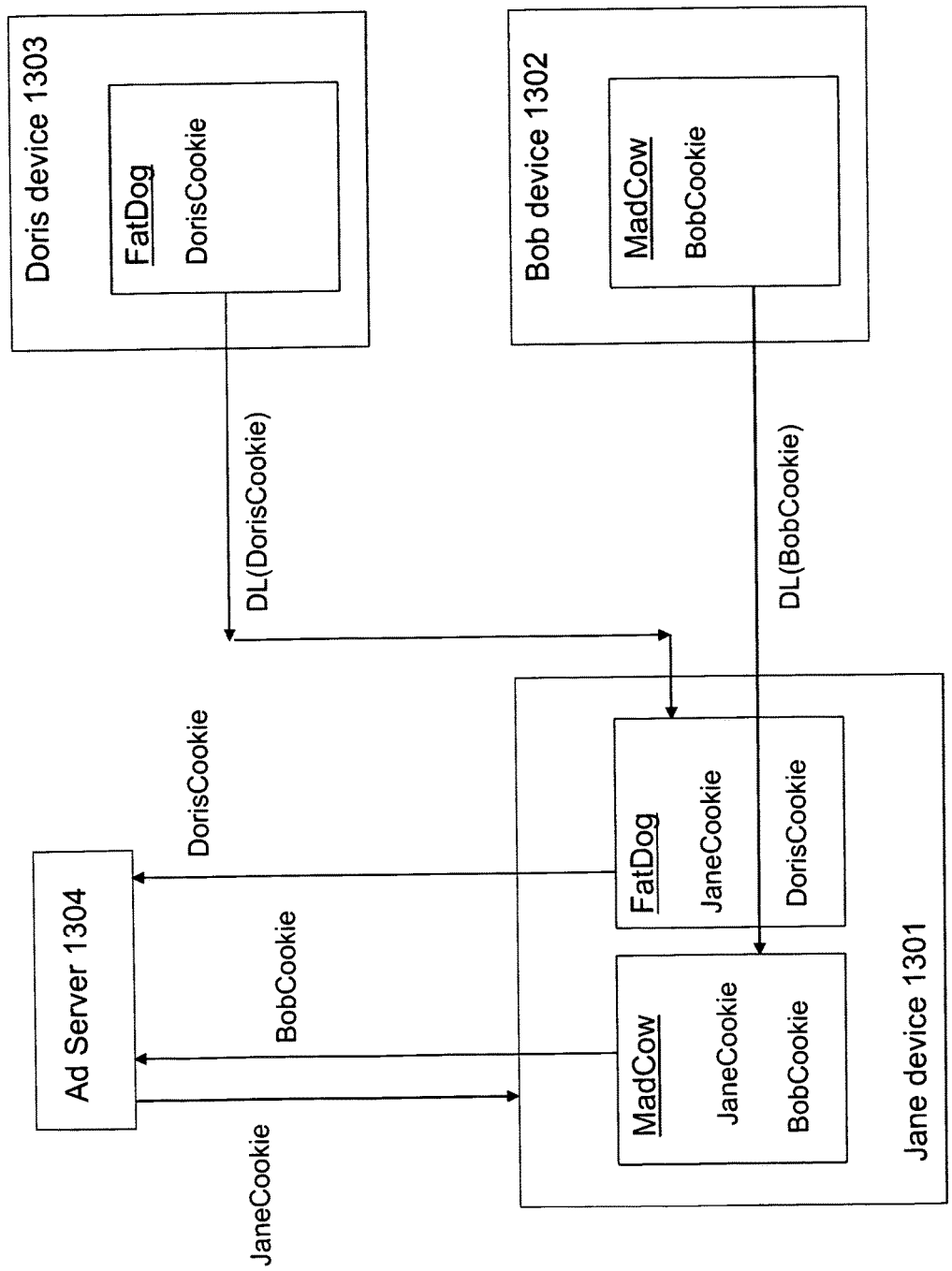
Figure 13 – Cookies for 3 users

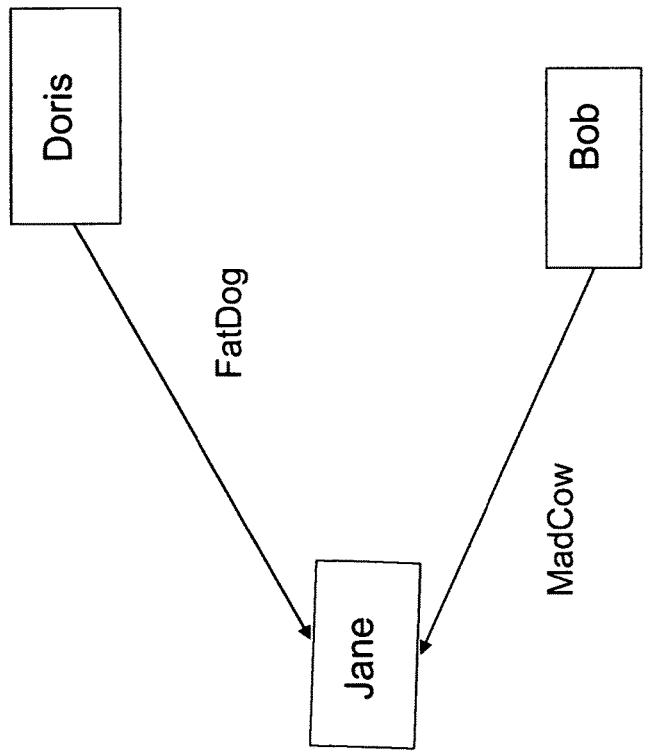
Figure 14 – Social Network

COOKIES AND ANTI-AD BLOCKER USING DEEP LINKS IN MOBILE APPS

REFERENCES CITED

"Apps everywhere but no unifying link" by C. Dougherty, New York Times, 5 Jan. 2015.
"Mobile ad-blocking risks becoming a barrier to innovation" by J. Ford, Financial Times, 18 May 2015.
"Generating and presenting deep links" by V. Tankovich et al, US Patent Application 20130110815 (Oct. 28, 2011).
"Methods and systems for facilitating an online social network" by C. Evans, US Patent Application 20140089413 (Dec. 6, 2013).
"Text-synchronized media utilization and manipulation based on an embedded barcode" by C. Evans, US Patent application 20130334300 (Mar. 27, 2013).
"Smart link system and method" by J. Chor, U.S. Pat. No. 8,433,800, (28 Feb. 2011).

TECHNICAL FIELD

The invention describes an interaction using a deep link, between a mobile app and a program on a different device.

BACKGROUND

Mobile apps have a distinctive problem. Most are currently standalone programs, that often just converse with an app server run by the company that wrote the app. The apps do not have URL links within them.

It is much harder for a search engine, which is optimised to search the Web for webpages, to search arbitrary apps. There is no standard syntax equivalent to an URL or URI to enable this.

To enable such and other functionality in mobile apps has been termed 'deep linking' within apps. (The term also has an earlier use that refers to standard web pages and URL links within them. This submission does not use that earlier meaning.)

Major companies have several projects aimed at defining deep links. Facebook Corp. has App Links. Google Corp. has App Indexing. Twitter Corp. has App Cards. There are also several startups, like Branch Metrics Corp., Quixy Corp. and URX Corp., with their own initiatives. The syntax and functionality vary between these company-specific efforts.

Much of the prior art on deep links has been where a user of a mobile device gets a deep link by some means, and then picks it. Or the deep link appears inside a first app, that the user is running. Then by various means, the app pointed to by the deep link is installed on the device, if the app is not already present. The app is run. This does not involve a communication between apps on different devices. And even when the apps are on the same device, when the second app is run, it might not interact with the first app.

Another issue with mobile devices has been the use of ad blockers, to block popup ads or ads appearing inside a mobile app. From the point of view of an ad server (i.e. ad publisher) this can be an existential problem. Also perhaps too for a firm which makes a mobile app where part or all of the revenue comes from showing ads.

Yet another problem with mobile devices is the lack of the equivalent of cookies for mobile apps, compared to the use of cookies with browsers on desktop machines.

SUMMARY

We describe how to use a reflexive or self referential deep link for multiuser interactions between mobile apps. An instance of a mobile app makes a deep link with at least 2 elements. A name or identifier of the app, so that the app can be found in an app store or app server. And the network address of the instance of the app.

The deep link can also have the geographic location of the instance. And perhaps a parameter indicating the number of users or watchers wanted, to take part in a multiuser interaction via instances of the app that are running on different mobile devices.

The deep link and others like it can be sent to a web server or app server. A page is made showing the links. A user with a mobile device reads the page on her device. She picks a deep link. The app is installed on her device if it is not already present. It is started. It uses the deep link to contact the instance that generated the deep link.

A deep link can have 2 addresses. One address is of a device that a user of a mobile app (which loads the deep link) is looking for information about. Another address is for a finder or tester device. The second address is called by the app if the device at the first address does not respond. The finder role gives information about the device, especially its location. The user can check the physical status of the device. The tester role lets the user run diagnostics on the device. This can be useful for Internet of Things, where a user with a mobile device needs to check the status or control various IoT devices.

Deep links can be used to bypass an ad blocker. A given instance of an app, running on a particular device, might be blocked from getting ads from an ad server. The app server tells the ad server to send an ad to another instance of the app running on another device. Where messages from the latter to the first device will not be blocked. The second instance relays the ad to the first instance.

A current problem with most mobile apps is that cookies do not work with them.

In response, we show how a deep link can have a cookie. When 2 instances of an app interact, with one instance sending a deep link to the other, the link has a cookie assigned to the instance by an ad server. When the second instance gets the deep link and contacts the ad server, it sends the cookie. The ad server assigns a new cookie to the second instance (and implicitly to its user), and associates the new cookie with the older cookie (which refers to another user). So the ad server can make a social network over time of users getting its ads.

BRIEF DESCRIPTION OF THE DRAWINGS

FIG. 1 compares a standard URL with a deep link.
FIG. 8 shows a use case of Add User for a multiuser app.
FIG. 9 shows how to get a deep link in a mobile device.
FIG. 10 shows how to bypass an ad blocker.
FIG. 11 shows using a cookie for a first time user.
FIG. 12 shows using a cookie for a second time user.
FIG. 13 shows cookies for 3 users using 2 apps.
FIG. 14 shows a social network derived from FIG. 13.

DETAILED DESCRIPTION OF THE PREFERRED EMBODIMENT

Figure 2:
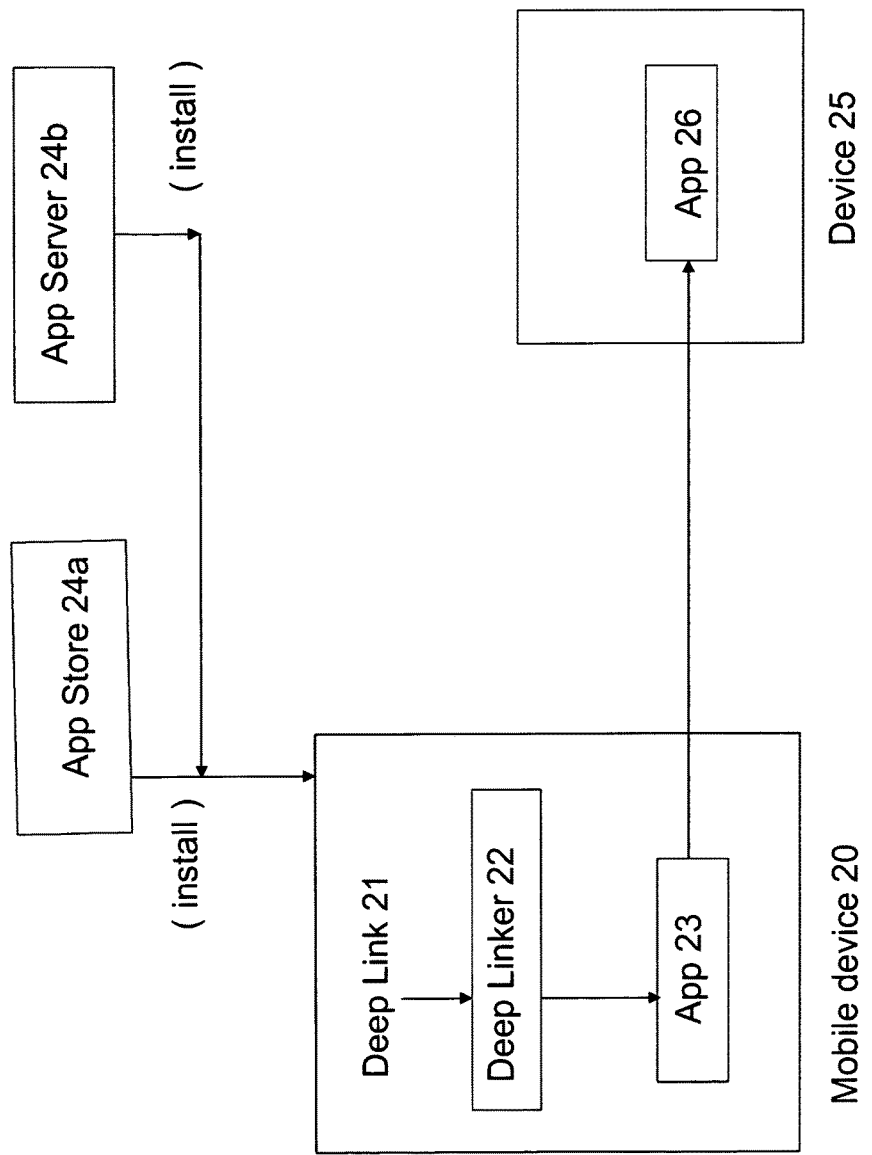
FIG. 2 shows a mobile device using a deep link to interact with a remote app.

What we claim as new and desire to secure by letters patent is set forth in the following claims.

This submission refers to our earlier submissions to the US PTO: "Cellphone changing an electronic display that contains a barcode", filed 16 May 2011, U.S. Pat. No. 8,532,632 ["1"]; "Using dynamic barcodes to send data to a cellphone", filed 28 Jul. 2011, U.S. Pat. No. 8,348,149 ["2"]; "Transmitting and receiving data via barcodes through a cellphone for privacy and anonymity", filed 4 Oct. 2011, U.S. Pat. No. 8,707,163 ["3"]; "Colour barcodes and cellphone", filed 16 Dec. 2011, U.S. Pat. No. 8,821,277 ["4"]; "Mobile device audio from an external video display using a barcode", filed 25 May 2012, U.S. Pat. No. 8,708,224 ["5"]; "Dynamic group purchases using barcodes", filed 29 May 2012, U.S. Pat. No. 8,655,694 ["6"]; "Chirp to control devices", filed 9 Oct. 2012, US patent application 20140098644 ["7"]; "Barcode-based methods to enhance mobile multiplayer games", filed 22 May 2013, US patent application 20140349746 ["8"]; "Barcode, sound and collision for a unified user interaction", filed October 2013, US patent application 20150113068 ["9"], "Deep linking of mobile apps by barcode, sound or collision", filed Feb. 18, 2015, U.S. patent application Ser. No. 14/544,763 ["10"].

In a recent submission "10", we described deep links and ways that these could enhance interactions between two mobile devices near each other. The current submission describes more ways for mobile interactions. Primarily now the devices need not necessarily be close to each other. And where one of the devices need not be mobile.

We define some terminology.

This submission is mostly about mobile devices carried or worn by people. The most common mobile device is a cellphone. We take this word to also include "smartphone". The latter term arose to describe a cellphone that also had a camera and Internet access, when such features were relatively new to cellphones. Other types of mobile devices are tablets, laptops, notebooks, netbooks, PDAs and wearable devices.

We will make frequent reference to "app store" and "app server". Despite the similarity in names, these are different entities. An app store is typically run by a maker of a mobile device (like Apple Corp., Microsoft Corp.), or a provider of an operating system for mobile devices (like Google Corp.). Software companies that make mobile apps submit these to an app store. So users can find the apps in the app store and download them to the mobile devices. An app server is a server run by one of those software companies. A mobile user can use her device browser to go to the website of the app server, to download the app.

This submission has the following sections:
1: Reflexive Deep Link;
2: Embedding a Location in a Deep Link;
3: Transmitting a Deep Link via a Browser;
4: Transmitting a Deep Link via an App Server;
5: Other Parameters in a Deep Link;
6: Transmitting a Deep Link Between Known Users;
7: Where's my Device? (What happened to it?);
8: Add User;
9: Add Watcher (e-Sports);
10: Collision, Audio or Bluetooth instead of Barcode;
11: Interface;
12: Bypass Ad Blocker;
13: Multicast;
14: Deep Link and Cookie;
15: Other Remarks;
1: Reflexive Deep Link There is no single industry standard for solving the deep linking problem of mobile apps. However, this submission describes functionality different from current uses and proposals.

For convenience, we assume that a deep link (DL) is expressed as a string, instead of a raw binary sequence. This follows from the success of the URL form of http:// and https://. The string names of these URLs make them human readable and editable. Likewise, we expect that any widely used format of a deep link will also be a string. The string need not necessarily be confined to Ascii characters. Unicode characters might be possible.

We assume that the various proposed methods for deep links are valid, in that they offer addressing means for links from within an app, to other assets on an electronic network. Instead, we go on to describe what could be done, given this as a starting point.

Existing efforts differ from each other in the syntax. However several efforts have taken one common form. See FIG. 1. The top shows an example URL. The syntax of this will be familiar to the reader. There is the prefix http://. Followed by the domain, and then some extra text that is meaningful to the web server that would parse this URL and return a web page to a querying browser. The characters preceding "://" are sometimes called the scheme of the link The lower part of FIG. 1 shows an example deep link. Some previous industry efforts have suggested a format where the app name is the start of the deep link. Followed by the "://" symbols. The reader can see the similarity thus far between the deep link and the URL. But what follows in the rest of the deep link? Here, the prior art differs between the proponents. Keep in mind that not all the prior art uses the deep link format in FIG. 1 anyway.

This submission suggests that after the "://" can be an address of an instance of the app. This can be written using a domain name. But perhaps more realistically, it can be written using the raw Internet numbers. The example in FIG. 1 assumes Internet Protocol version 4, for simplicity. But IPv6 notation could also be used.

More broadly, without restricting to the format suggestion of the previous paragraph, this submission advocates a deep link with at least 2 parts. One is an identifier of the app. The other is an address of an instance of the app, where this instance is the one that makes the deep link.

The proposed notation in FIG. 1 cuts to a fundamental difference between an URL and a deep link. An URL is an address of a web page. Where the domain part refers to a web server, at some fixed network address. But a deep link can have implicitly or explicitly 2 addresses. Implicitly because some formats of a deep link might not need to write both addresses.

A deep link refers to a mobile app. Suppose a given mobile device gets a deep link by whatever means. (We will elaborate on this later.) The user might want to run the app. In general, she might not have it installed. The deep link should have a name or identifier of the mobile app, sufficiently unique so that an installer program on the mobile device can parse the deep link and find a source of the app. This source can be the official app store for the device. Like the app store that Apple Corp. runs for its iPhone and iPad devices, or the app store that Google Corp. runs for Android devices. The installer can automatically download and install the app, or it can first ask the user if she wants to install it. Another source could be an app server run by the company that wrote the app.

Much of the prior art necessarily devotes time to handling this case. Often the prior art goes on to start the app and pass it the rest of the deep link. A typical use case of the latter is that it refers to some "position" in the app. Analogous to an URL that refers to a tag position halfway down a web page.

But when an app is run on a device, that is a particular instance of the app. An app can have a multiuser aspect, where 2 or more users run instances concurrently, and those instances interact. If this is possible, then the instances might communicate via an app server. This was discussed in submission "10". Another possibility is that the instances talk directly with each other in a peer to peer manner. While still possibly interacting with an app server. This might be done through a use or the modification of the WebRTC (Web Real Time Communication) protocol for example. This is a standard for enabling real time communication between web pages.

Much of the complexity of WebRTC is due to the real time nature of that intended interaction, via audio or video. If an implementation of the current submission does not need audio or video, it likely that a much reduced subset of WebRTC could be made.

The multiuser aspect of mobile apps is the second major difference between the use of the Web and the use of mobile apps. With the Web, imagine two users simultaneously looking at the same web page. This is where each user has her own computer on the Internet. Each computer runs its own browser. And each browser has a copy of that web page. The users are in different locations and do not in general know each other. And cannot interact, in the vast majority of viewings of web pages.

An app instance could make a deep link with a second address—the address of the instance. This is shown in FIG. 1. The raw Internet address 10.20.30.40 is assumed to be the address of the instance. In general, an instance running on a mobile device with access to the Internet will not have a domain name associated with it. So it uses a raw address. But the mobile device might have a permanent Internet address. Such is possible under IPv6. One of the motivating features of the design of IPv6 was to easily let a mobile device have a fixed address. Under this case, the device could have an actual domain name, which could then appear on the right side of the "://" in FIG. 1.

What currently often happens is that when a mobile device (and thus any apps on it) accesses the Internet, it connects through a WiFi hot spot or a phone carrier. The latter is likely when the mobile device is a cellphone. In both cases, by various means, the device can be temporarily allocated an Internet address, via which it accesses other addresses on the Internet. In the context of this submission, we consider both mechanisms to be equivalent.

Also, several apps on the device could be running and listening on the network. A port number for the given app to listen to would likely be desirable. The example in FIG. 1 explicitly writes a port number. A given app could have a default port number. Perhaps this could be omitted in FIG. 1. Because another instance of the app will know to write to this port. But a problem can arise if other apps or firmware on the receiving device want to use that port. So whatever notation is used for a deep link should include the ability to write a port number.

More generally, consider when we said a given app could have a default port number. The scope of the default can vary. For example, the scope can be specific to each app. So when an app is written, its programmers define a default port. So that instances of the app can use this without explicitly specifying a port. Though perhaps a non default port can be used, with explicit enumeration.

A broader scope can be all apps written by a given company use a default port. Or a standards body (like W3C) could recommend a default port for all apps using this submission.

The submission advocates the use of a deep link with two addresses or identifiers. An identifier of the app, whereby the app can be installed from some source on the network. And an address of an instance of the app. Often, if that instance makes the deep link, then the deep link refers to itself. Hence it is a self referential deep link or Reflexive deep link. We will use the latter term.

The deep link might have a third address or identifier, of an app store or app server from which an instance of the app can be downloaded. Though the reader might appreciate that if this can be omitted, it greatly shortens the deep link.

Our previous submission "10" largely discussed cases where the deep link explicitly encoded the address of an app store or app server. While we stand by our remarks in "10", the current submission can be construed as an improvement in the structure of the deep link.

There is an analogy with email addresses that might be instructive. Sometimes, prior to 1994 or so, some email addresses were given in a "bang path" notation, where the sender would specify intermediate mail routing machines. This was also true in the 1980s with the DECNET mail protocols. For both cases, the sender could not just send to a username at some destination machine name. Often, the names of one or more intermediate routers was required. Such measures were cumbersome and error prone to remember and type. The rise of more powerful routing obsoleted those methods.

Likewise, this submission in part proposes an improvement over submission "10", by describing how to omit the explicit naming of a remote app store or app server from which to download an app. The location of that remote server is factored out into the Deep Linker and into its interaction with a (remote) search engine.

In some cases, the program that makes the deep link with the above addresses might not be the instance of the app. It could be another program on the device that the app is running on. Or the program might be running on another device. Nonetheless, we will still use the term "reflexive deep link".

Consider FIG. 2. Mobile device 20 "gets" by some means Deep Link 21, where the latter refers to an instance of an app, App 26, running on Device 25. The submission will later describe various ways that Mobile device 20 could get Deep Link 21. For now, just consider that this has occurred.

There is a program Deep Linker 22 running on Mobile device 20. It takes Deep Link 21 and parses to find the app name. If the app is not installed, it goes to App Store 24a or App Server 24b to install. (We give more details on this below.)

Deep Linker 22 starts the app, depicted as App 23. Note that App 23 and App 26 are 2 instances of the same app. Deep Linker 22 passes Deep Link 21 (or some portion of it) to App 23. This might be done at the starting of App 23, where Deep Link 21 is an input argument. App 23 extracts the address of App 26 and makes a peer to peer connection to it. The 2 instances now interact.

The labels "(install)" placed near the arrows going from the boxes for App Store 24a and App Server 24b indicate that the primary role of those 2 entities is to offer the ability to install the app. Note that whether either of these is used for installing, when App 23 starts, it is likely to contact App Server 24b to "check in" and do whatever initialising is necessary with respect to that server. This is common for many apps, and is not explicitly designated in FIG. 2.

Deep Linker 22 can be an alteration or extension of an existing program on Mobile device 20. This also includes the case where some or all of the functionality of Deep Linker 22 is part of the operating system of Mobile device 20. The functionality of Deep Linker 22 can be distributed amongst several programs on Mobile device 20.

Figure 3:
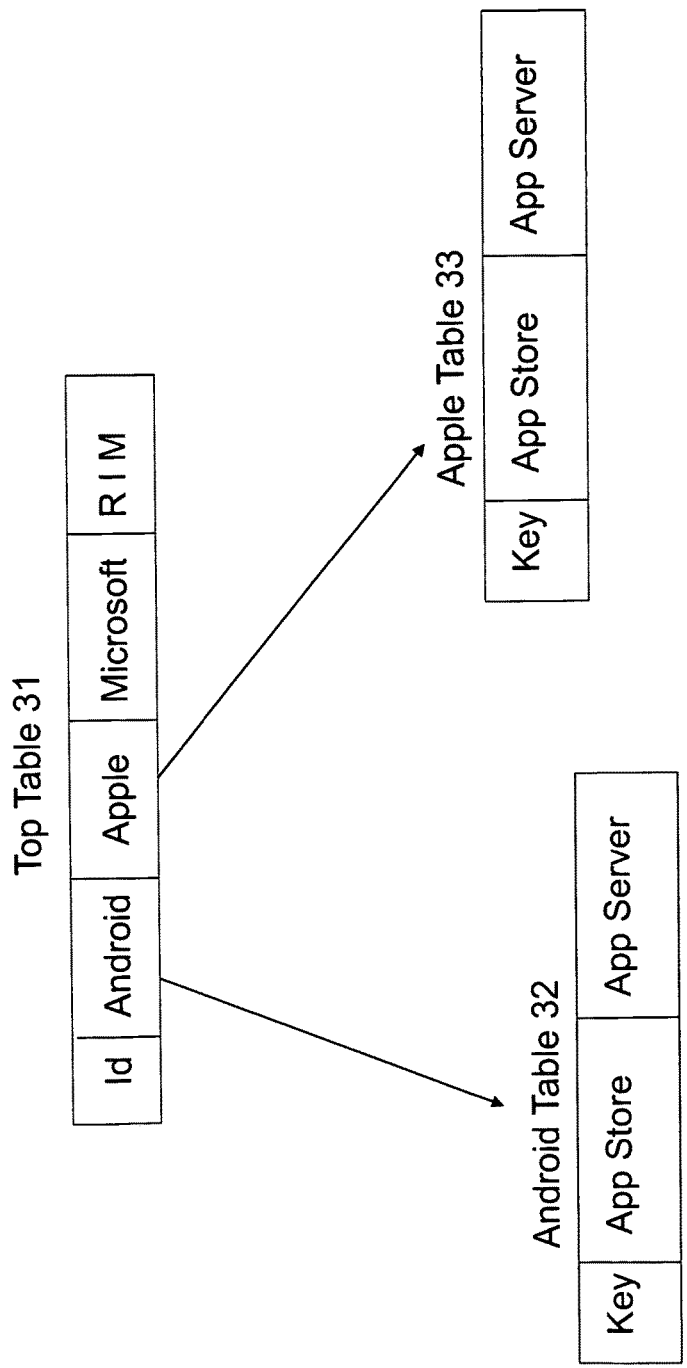
FIG. 3 shows a relational database for finding an app.

Above, we described Deep Linker 22 getting Deep Link 21 and parsing it to possibly install the app. Here are more details on one means of doing this. The following is a relational database approach. In FIG. 3, imagine that the identifier part of Deep Link 21 is the key to Top Table 31. The non-key columns of that table are the main hardware platforms. Shown are headers for Android, Apple, Microsoft and RIM (Blackberry). There could be other mobile hardware platforms at present, but these are the main ones. In future, there could be more platforms, which would then be extra columns in Top Table 31.

A value in the Android column would be a key in Android Table 32. The non-key columns are App Store and App Server. The value in an App Store column would be the identifier of the given app in the Google App Store. The value in an App Server column could be the URL of a web page with a link to a binary on the app server run by the company that made the app. Or the value could simply be an URL link to the binary itself.

Similar statements could be made for the example of Apple Table 33.

One difference between the App Store and App Server columns is that for a given device or platform, the address of the App Store is already known to the Deep Linker. Whereas there can be thousands of app server sites, whose addresses are not known a priori to the Deep Linker.

The relational database of FIG. 3 is not mandatory. Indeed, given the simple structure of the tables, other table structures can be used. Like a single monolithic table. Or a non-relational approach can be implemented.

Figure 4:
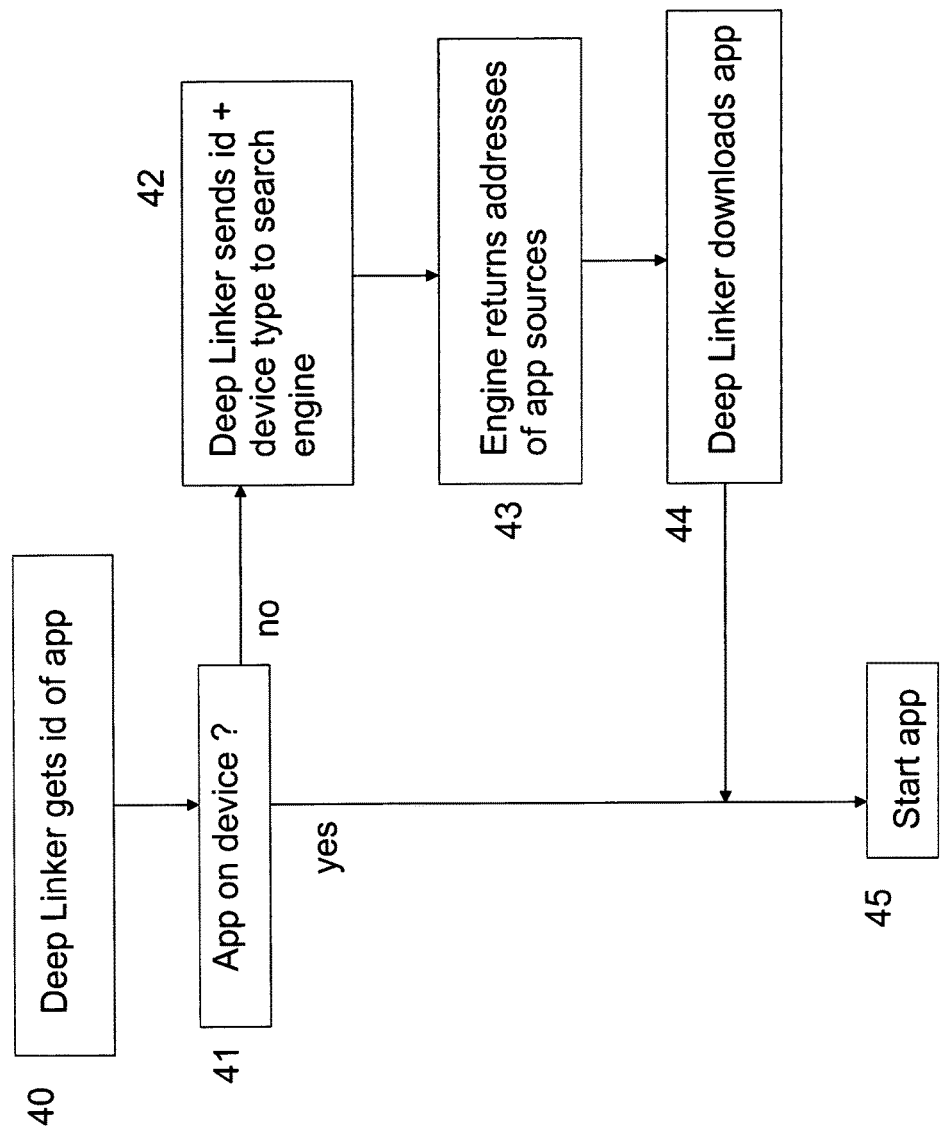
FIG. 4 shows a Deep Linker finding an app from its id.

Now consider FIG. 4. Item 40 is where the Deep Linker gets an identifier of an app—"madcow", for example. Item 41 is where the Deep Linker searches the mobile device it is on, to see if the app is already present. If not, we go to Item 42. The Deep Linker sends the identifier of the app and an identifier of the type of the mobile device to a search engine. Trivially, the Deep Linker knows the latter identifier. It can be assumed to know various parameters about the hardware and firmware environment in which it is installed and running.

The search engine holds the tables of FIG. 3. The 2 identifiers sent to it are a key and a column in Top Table 31. They define a cell in the table. The search engine uses this cell as the key to a line in one of the lower tables. The engine can then return the non-key values of the line to Deep Linker in Item 43.

In Item 44, Deep Linker uses these values (assuming there are any) to pick a source on the network from which to install the app appropriate for the hardware of the mobile device. If there are multiple choices, Deep Linker might have various rules to pick one. For example, one rule could be that if one source is an App Store, and another source is an App Server, then pick the App Store because the latter is more trusted. Whereas an arbitrary app server could have an unknown reputation.

Item 45 is where the app is started.

Another rule could be to pick the app server if what it charges to download is less than what the App Store charges.

For simplicity, we omit any steps to do with the mobile device paying for a download, if payment is required. There are well established means to do this in the prior art.

When we say "search engine", this could be a general purpose search engine, or one built for this submission.

A variant is where the search engine hosts some of the apps, making them available for download.

In FIG. 3, there could be elaborations. For example, for Apple, there might be several tables. One for iPhone™, one for iPad™, etc. While Apple tries to maintain one binary for each app, that runs across these platforms, this might not always be the case. Likewise or more so, for Android, where the underlying hardware is made by different companies and so is more heterogeneous.

Another possibility is that there could be different app servers for a given app. A third party company could make an App Store, where the company has no formal control over any of the mobile hardware. One way to have FIG. 3 handle this case is to allow several app server columns.

2: Embedding a Location in a Deep Link

Consider again FIG. 1. In the example of an URL, there is an argument to the right of the domain—"ape.html". Whereas the example of a deep link has no arguments to the right of the reflexive address. In the definition of what constitutes a valid URL, the right hand side could have various parameter=value pairs, where the name of a parameter is decided by the web server for that page. There are no default recommended names of parameters in URLs. This has proved to be successful for the Web.

However, in the last 10 years of using mobile apps, one successful feature is the use of the location of the mobile device. Many apps do this. This submission recommends the definition of 2 specific parameter labels that define the location. For latitude and longitude. For each, a value could also be specified in the deep link. Purely as an example, the equals symbol can be used to assign a value to a parameter, and the parameter=value pairs could be delimited by ampersands, just as for an URL.

Thus an arbitrary program that gets a deep link can parse it looking for the location, without having to know the meanings of various specific labels used by the app referred to by the link. Where the latter meanings are unique to the app. And the program does not have to make another network query to the app, asking for its location. The query takes time and energy for both the program and the app.

We stress that we do not require a deep link to encode position information.

3: Transmitting a Deep Link Via a Browser

Figure 5:
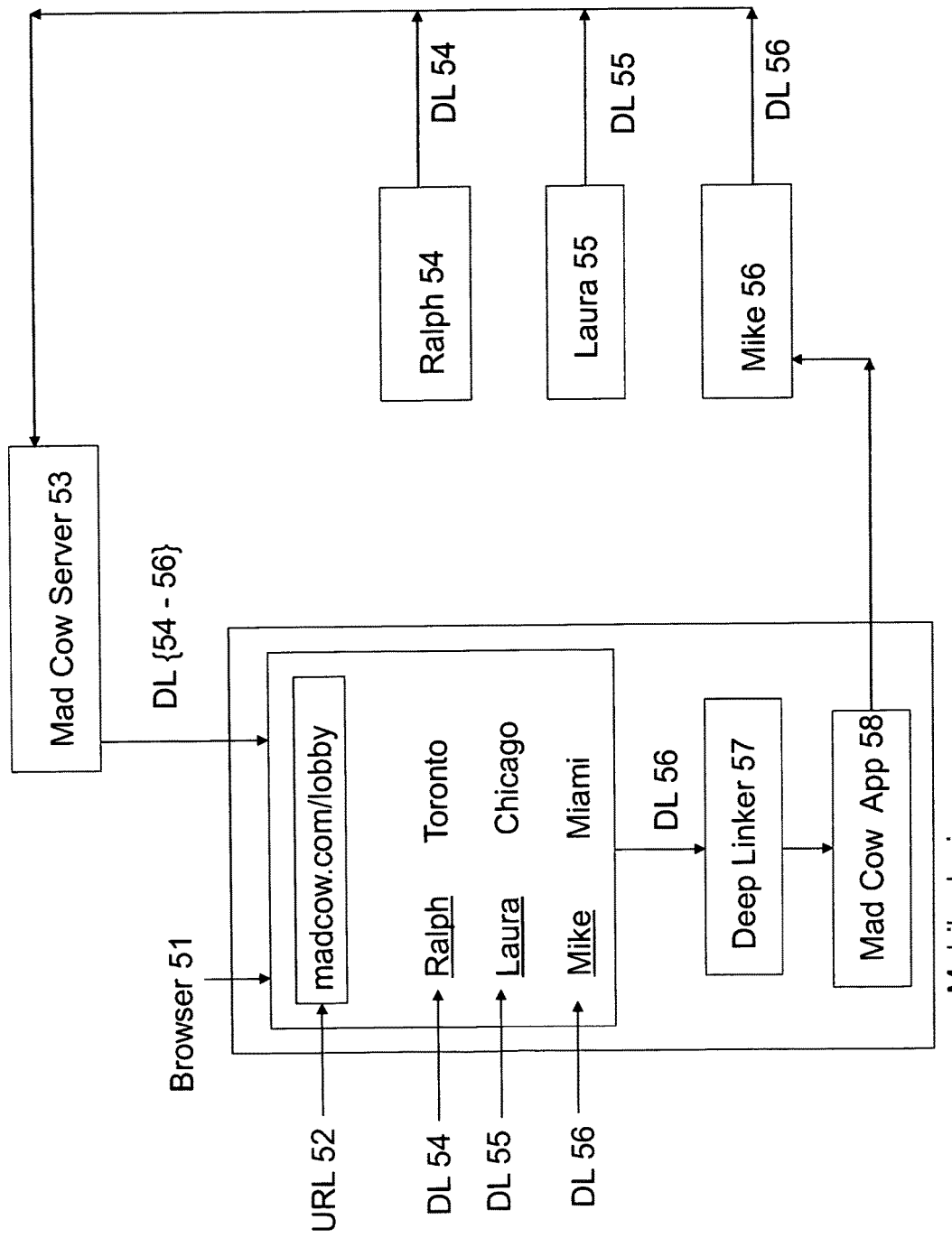
FIG. 5 shows a browser in a mobile device, with a page of deep links.

How does Mobile Device 20 get Deep Link 21? One way is via a browser and a web server. See FIG. 5. On the right hand side are 3 users and their mobile devices—Ralph 54, Laura 55 and Mike 56. Each device is assumed to be running an instance of the Mad Cow app. Ralph 54 is in Toronto, Laura 55 is in Chicago and Mike 56 is in Miami. In general, they do not know each other. Each wants to play another person using the app. The app is assumed to allow a multiplayer mode.

Ralph 54 picks an option in his app that makes a deep link DL 54. It refers to the network address of his device. The deep link might have the device geographic location written in it, as per the previous section. By default perhaps, the app might write this into the deep link, whenever it makes a deep link. The app uploads DL 54 to Mad Cow Server 53. The app knows the address of the server because likely it is hard-wired into the app. The company that wrote the app maintains the server, so this is possible.

Likewise Laura 55 and Mike 56 also upload their deep links to the server. There is no coordination between them. But all 3 are assumed to do this at nearby times. So that for some time interval afterwards, all 3 are looking for other players.

Mad Cow Server 53 is 2 servers. It is a server for deep links. In this example it is also a web server. The server makes a web page at an address "http://madcow.com/lobby". Any URL can be used as an example. But we write this particular URL for illustrative reasons. The users who want to find other players are listed in this "lobby". Like a lobby in a hotel, where people wait for others.

The web page is shown in Browser 51 of Mobile device 50. URL 52 is the above address. While the contents are shown as DL 54, DL 55 and DL 56. Strictly, the contents of the page are not the original deep links that came from the users. Rather, Server 53 wrote the page to be more user friendly. Note that "Ralph" in Browser 51 is underlined. To indicate to the user that "Ralph" is a selectable link. Likewise, "Laura" and "Mike" are also underlined. Next to each is the name of the city that the person is in. Server 53 used the location information in each deep link and converted this into a more human understandable form. There are long established techniques in Geographic Information Systems to do this.

Depending on the app, there might be a version that can be run on a web page, where the web version could interact with the app version. If the game company has both versions, the web page in Browser 51 might list also the users who are using the web version, and who want to play others. This list could be separate from the above list of app users, or there might be one list with both types commingled.

The names Ralph etc shown in the figure might be found if when the players put themselves in the lobby, they had to log into their accounts on the server. Where they had now or earlier defined certain information about themselves, including a game handle or nickname, like "Ralph".

The figure shows a location next to a player. The server might downgrade the resolution of the location information it got from the deep link, for reasons of privacy perhaps. So the example describes the location as the city the player is in.

A user, Jane, of Mobile Device 50 brings up Browser 51 and goes to the above URL of the lobby, to look for someone to play with. This of course assumes that Jane already knows about the game and the domain madcow.com.

In this case, since the web server is run by the same company that wrote the Mad Cow app, there could be other parameters in the deep links that are specific to the app. The server could use these to show other information for each user in the lobby page. Jane can use this to help her decide which user to play.

One reason Jane can use the location information is to find the closest instance. This can reduce delays when interacting. A consideration for some twitch ("shooter") games, for example.

Suppose she picks Mike, for whatever reason. When she clicks this link, Browser 51 gets her choice. It gets the link information. It parses and sees that it is not a standard URL, because in this case the link starts with the scheme "madcow" instead of the typical "http" or "https". The browser is assumed to know about the format of a deep link. It sees that Jane has picked a deep link DL 56. The browser starts a subprogram or a separate program, Deep Linker 57, that is on her device. Or Deep Linker 57 might be a program that is already running on the device, waiting for communication from the browser. The browser inputs DL 56 to Deep Linker 57. The latter does any necessary steps to install the app if it is not already present on Mobile device 50.

Deep Linker 57 starts Mad Cow App 58 with DL 56 as input. When the app starts, it extracts the address of Mike 56 from DL 56. The app communicates with this address. This is depicted by the arrows going from Mad Cow App 58 to Mike 56.

Once the interaction starts, it is likely to be two way, and not confined to the unidirectional nature that might be implied by the arrows in the figure, which are meant to just indicate the initial contact.

The app can also interact with Mad Cow Server 53.

4: Transmitting a Deep Link Via an App Server

Suppose a user, Jane, of a mobile device, already has an app installed. Another means of the app getting a deep link is to contact its app server. Bypassing the use of a browser in the previous section. Assuming of course that the app has an app server. But this is often a good assumption. A company that writes an app wants it to be successful, often in a monetary sense. To monetize de facto requires that the app contact its app server. So that the latter can send ads, or upsell items, or charge for the use of the app.

Figure 6:
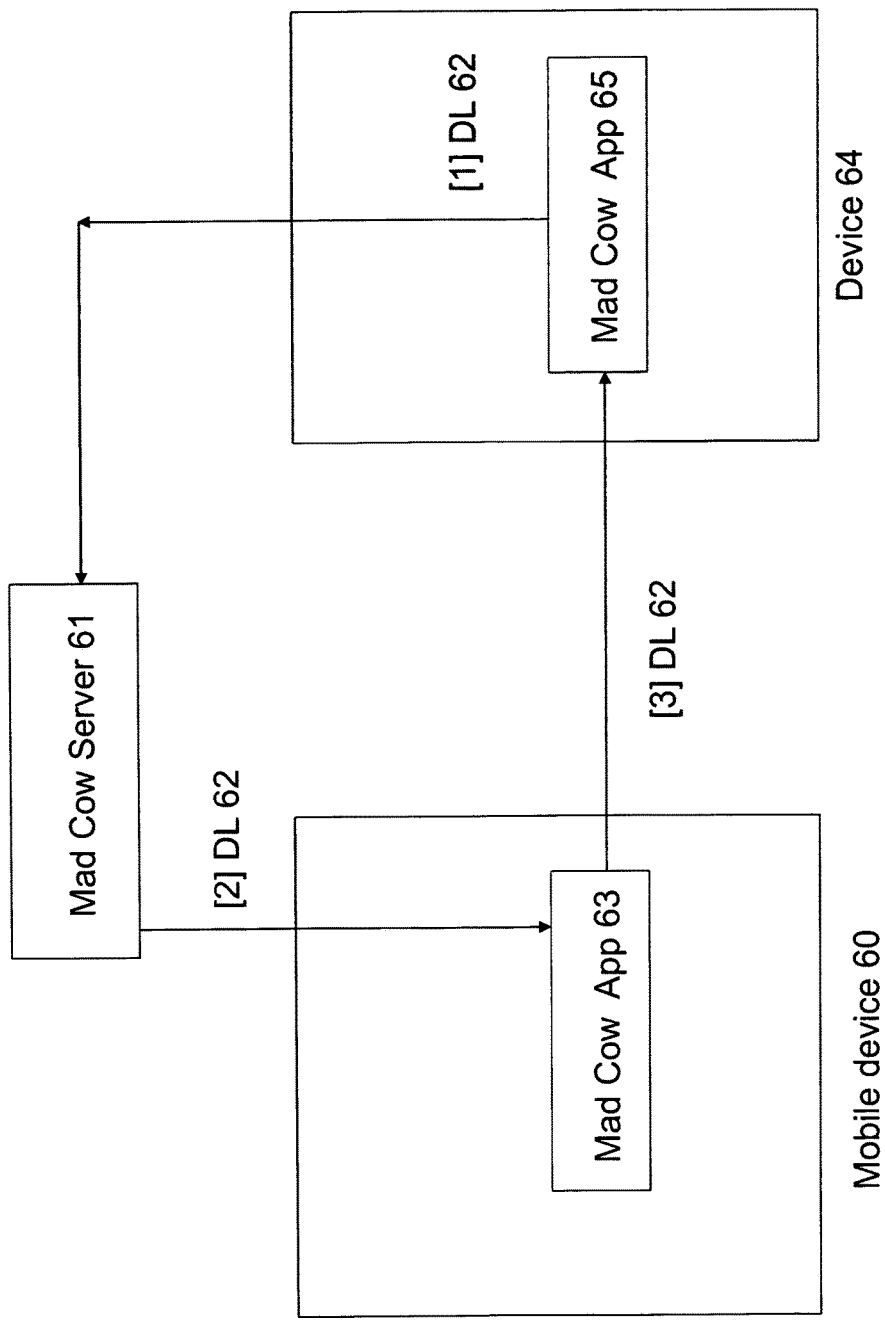
FIG. 6 shows 2 devices interacting via an app server.

See FIG. 6. Jane has Mobile device 60. At some recent earlier time, a user, Mike, of Device 64 was and presumably still is running Mad Cow App 65. He wants a second player. Mike has his app instance make and upload deep link DL 62 to Mad Cow Server 61. The "[1]" by the label "DL 62" indicates that this is the first step.

Jane has her App 63 ask the server if there are players who are looking for a second player. She wants to be that second player. In response, Server 61 downloads "[2] DL 62" to her App 63. The "[2]" indicates that this happens after the earlier step. In general, Jane's app might ask the server for several such players. This request might have some criteria she imposes.

The server could download a deep link for each player who satisfies her criteria. For simplicity, FIG. 6 only shows the downloading of one deep link to App 63. In general, FIG. 6 is the equivalent of the lobby web page of FIG. 3. So we can speak of a lobby page, whether it is a web page or a window in an app.

Her app opens a connection to App 65, as indicated by the arrow with the label "[3] DL 62".

Subsequent interactions between the 2 instances are likely to be bidirectional.

5: Other Parameters in a Deep Link

Most parameters in a deep link will be expected to be specific to the app. But whether a parameter is such, or whether it is a "basic" parameter, like latitude or longitude, we suggest some that might be useful for some apps.

The deep link could have a parameter that indicates the (maximum) number of users wanted for an app, where the app might be a game.

A different parameter might be whether an app can have an observer or watcher. The app itself might be an inherently single player game, for example. But whether single or multiplayer, the app company might permit observers. The observers might be new to the game. But being an observer is one way to induce people to later became active users. This is e-sports or electronic sports, which thus far at this time of writing (2015) is largely confined to the watching of real time console or desktop games. A utility of this submission is to expand the scope of e-sports to include the real time watching of mobile app games or activities.

Also, one allure of pre-existing e-sports is the chance of showing ads to the observers, or charging them to watch a game. Likewise, similar revenue sources are possible for app watching.

If a parameter is put into the deep link for this purpose, there could be variants of it. The above parameter was a Boolean. But it or another related parameter could be the maximum number of observers.

If a parameter is a number of users, then when someone joins, the server might update the page showing the lobby, to indicate this. If there is a maximum limit, then the entry for a given app instance could show the current number of users and the maximum.

Another parameter can be the time when the app will actively be used. The user, Mike, of an app might want to schedule a future use by writing this start time into the deep link. When the link is promulgated, this gives time for others to join. Before the start time, the app might go into a dormant or background mode on the mobile device. To not distract Mike and to minimise energy use.

When Jane signs up before start time, if this is done via the web or app server, her device might also communicate with Mike's app, since the device now has the app address. The dormant mode of the app could listen for this. It might alert Mike, telling him that someone has joined. Maybe by beeping or showing a popup window. Her instance of the app could go dormant in the same manner as Mike's instance, until the start time. When the latter is reached, the app could activate itself. Or there might be some supervisory program, perhaps part of the mobile operating system, that wakens the app. Where this program had earlier been told the necessary information.

However, while Jane has seen the deep link in a page from the server, if she clicks on it, this takes her directly to Mike's app, then the simplest way is for her to sign up directly with the app. If she does so, Mike's app can then communicate with the server, telling it to update its listing for Mike, to show that someone has signed up.

Another parameter in the deep link might be information about bandwidth to and from the app.

Another parameter in the deep link could be an identifier of the program that will be listening at the given address. In this case, the deep link could be summarised symbolically as—
[id of app] [address to connect to] [id of program listening at that address]
and one example might be—
madcow://15.16.17.18:3015//cowserver This syntax can be for the case where the program listening at the address is an instance of a different app than that referred to in the first parameter—"id of app". So in the above example, we have the identifiers or names of two programs "madcow" and "cowserver". Where cowserver is at the address 15.16.17.18 and listening at port 3015.

The syntax gives more information to whatever program might parse the deep link. Perhaps to let that program decide whether to install or run the first app. An example of the program might be what we termed a Deep Linker in our previous submission and in this current submission.

More generally, the program might not be to install the app. The program does not have to run on a mobile device. It might be run by a computer in a data center of a search engine, where the latter is trying to accumulate data about deep links.

6: Transmitting a Deep Link Between Known Users

Consider when a user Mike of an app wants other users to join. The app can make a reflexive deep link. Mike can use his device to send this to others for which he already knows their electronic addresses. Like their email addresses or their phone numbers. Or their usernames on a social network of which he is also a member. By perhaps copy and paste into a message body to be sent via his device.

7: Where's My Device? (What Happened to it?)

Refer to FIG. 1 and the discussion in Section 1. A deep link had a name of an app and an address of an instance of the app. A device executing the deep link would make a new instance of the app, which communicates with the earlier and different instance referred to in the deep link. Now imagine a different scenario. Perhaps aided by a trend of the Internet of Things (IoT), where many devices are now on the Internet. They might be items like a desk, a table lamp or a smoke detector.

Figure 7:
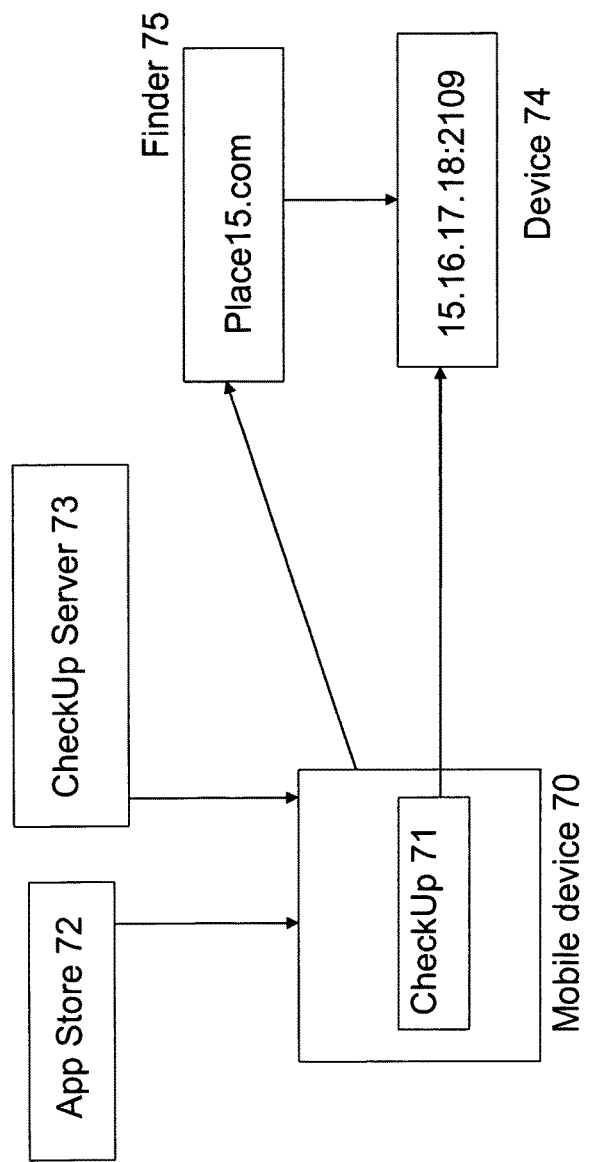
FIG. 7 shows a deep link for 3 devices.

See FIG. 7. The top line shows a schematic of a deep link with 3 elements. The second line has an example in the format of FIG. 1. The first element is a name of an app. The second element is an address on the Internet, to which address the app can communicate with. Here, a use case is where the app runs on a mobile device, and the app is meant to find information about and possibly control another device. In this case, the latter device need not be mobile. It is assumed to have an Internet connection, and it has a program or daemon that listens on this address. Thus far, the 2 parts of this deep link are not greatly different from what was discussed earlier.

Mobile device 70 has an instance CheckUp 71 of the CheckUp app. This was installed from App Store 72 or CheckUp Server 73, using the scheme part of the deep link, "CheckUp", via steps described in earlier sections. CheckUp 71 then tries to contact Device 74, at address 15.16.17.18: 2109, using the second part of the deep link.

The third part of the deep link is the address of a third device, Finder 75. A "finder" or a "tester" of the second device. For the likely inevitable case where if CheckUp 71 is meant to talk with Device 74, then for some of these interactions, Device 74 will have problems. Perhaps it will simply not respond. A fundamental and pragmatic aspect of hardware.

One solution is that when CheckUp 71 tries to talk to Device 74, and gets no response, then it contacts Finder 75. The latter can do one or both of two tasks.

First, it can act as a finder. It replies with information about the physical location of the second device. This can be in the form of a map, like a floor plan of the floor where the device is. The map might have a path from some central location to the device.

Note that GPS coordinates of the device may be unavailable or of limited use. The device could likely be in a building, where GPS cannot be accessed. Or even so, where the lat-long resolution is too crude. One possibility is that there are several floors in the building. The GPS might not be able to tell which floor.

The finder information can also have images of the device. One image could be of an instance of the device when it is newly made at a factory, or in a store. Another image might be of the actual instance that the user wants to contact. The image shows the instance and its surroundings. Useful if the device is located in a cluttered environment where nearby items might look similar or partially obscure the view of the device. As a practical matter, when the device is installed, the person doing so might use a cellphone to take a photo of the device, showing it in its physical context. She uploads the photo to the finder, to be stored as part of the data about the device. Of course, there could be several such images, taken at different vantage points and distances from the device.

A variant of this is where the images do not show the device itself. Possibly because the device is blocked from view by other devices. So the image/s might be of those devices, with some graphical markup to indicate where the actual desired device is. For example, the markup might indicate that it is behind a panel that thus has to be opened to access the device.

Also, the phone might generate location data for the device, especially inside a building where GPS is not directly available. The building might have some type of beacon or other custom hardware installed. The phone could have a means of using the beacon to find its location.

When the user (who might be a system administrator) installs the device, she runs software that takes a photo of the device in its location and also records the location. The photo and location data are uploaded to the finder automatically by the software.

Images showing the device (or a path to the device) could have image processing done to enhance the ease of getting to or finding the device. And when we say images, these might be video.

Knowing the location, the finder can generate a route to the location from some starting point. The starting point might have been earlier preset by the user. Or chosen automatically by the finder. The starting point could be an entrance to the floor, like the lifts.

The finder information can include steps the user can take when actually at the device. Like checking any status lights. Or how to reboot the device. Or how to dismantle it safely.

The user and the mobile device who compiled this finder data are probably different from the user and Mobile device 70 in FIG. 7, who later want to get this data.

If IoT devices proliferate, just keeping track of where such devices are in a workplace can be non-trivial. A utility of this section is to aid in this effort.

The other role of Finder 75 is to act as a tester. If Device 74 can be accessed by Finder 75, the latter can run diagnostics on Device 74.

Note a basic difference between the finder and tester roles. The finder does not need to be able to contact Device 74. Any second device can be described by the finder. Whereas, a tester means that Device 74 needs to allow some remote access protocol. There might have to be a wired or wireless connection between the tester and Device 74. And the tester needs to be programmed to use this protocol, and to have any necessary hardware.

For both roles by Finder 75, it may or should require that Mobile device 70 furnishes a password. This can also apply to when Mobile device 70 makes the initial access try to the Device 74. A typical expected use of this section could be by an employee of a company owning Device 74, and not by a member of the public.

Device 74 can be a screenless device. An electronic display screen can be expensive to make and to run (in terms of power consumption). If Device 74 is an IoT device, its primary purpose might be as something that is normally in the background. Also, Device 74 could be lacking an input peripheral commonly associated with mainly computational devices, like a keyboard, keypad or mouse. Another reason for not having a screen is if Device 74 is too small to have a screen of a useful size.

The second and third devices need not be close to each other. For redundancy, they might be in different buildings or towns. It can be expected that the devices are owned by the same company. Because of the physical nature of the situation.

When Mobile device 70 contacts Finder 75, if the latter acts as both a finder and a tester, then likely the default option is for the device to first act as a tester. To run diagnostics on Device 74. And by default, only if Device 74 is unresponsive, will Finder 75 give finder information to Mobile device 70.

One question that the reader could have arises from FIG. 7 and the deep link example. Suppose we replace the scheme app name CheckUp with http. Why not just use a standard http query in a browser? The problem arises if the device at 15.16.17.18 does not respond. A standard browser will give an http error like 404. It does not have the means (typically, if at all) of then parsing the URL to make another URL query to the place15-com string, which would need to be transformed to place15.com. Where this query would also need the 15.16.17.18 address transformed (presumably to 15-16-17-18) and put as an argument to the right of place15.com.

Whereas the CheckUp app can be assumed to have this failover logic implemented. In general, an app has arbitrary flexibility to handle an input argument like a deep link.

A followup question is why not take the URL as input to the app CheckUp, which will have the failover logic to parse the URL, instead of using a deep link? But this assumes the app is already installed on the mobile device. This goes back to Section 1 and FIG. 1. The deep link in FIG. 7 has the name of the app and so permits the app to be installed if it is not already on the mobile device.

There is a second issue. See again the deep link example in FIG. 7. Instead of using this, why not just have a standard URL http query, where the domain is place15.com (the finder or tester), with the argument being the address of the device that the user is interested in? The resulting web page could either control the device or have a link to it. This would be largely equivalent to the example in FIG. 7. The flaw is when the finder or tester itself fails, when Device 74 might be fine and still be directly accessible by the user.

Worse, the finder or tester is now a single point of failure for access to several (many?) devices. Which can be a greater problem than having a single "leaf" device fail.

8: Use Case=Add User

We now extend Section 3 of submission "10". In that Section, we described a scenario of two users, Jane and Bob, near each other. Both have mobile devices. Jane runs a multiuser app and she is the first user or player. FIG. 8 of this submission corresponds to FIG. 4 of "10" and extends it. Jane XYZ 81 is an instance of app XYZ, running on her mobile device. In step (1), the app contacts the XYZ Server 83 and gets an id of her app instance. The app makes a deep link, that has this instance id. It also encodes the address of the app, where now we assume that the app will listen on a port for a communication from another instance.

One important variant is where the instance id is taken to be the app or device address. Which simplifies the notation of the deep link. It also eliminates step (1) where the app contacts Server 83 to get the id.

The app makes a barcode from the deep link and shows it on the device screen in step (2). Bob Device 82 takes a photo of the barcode, decodes it to get the deep link. If necessary, Bob Device 82 contacts App Store 84 or XYZ Server 83 to install the app, if the app is not already on his device in step (3). After which, Bob Device 82 will likely contact Server 83 in step (4) to initialise itself. It might upload the id of Jane's app instance. Thus the server knows to put Bob's instance as the second player in Jane's instance.

Now the 2 instances can also talk directly with each other. Bob Device 82 extracts the address of Jane's instance from the deep link. It makes a network connection directly to Jane's device in step (5). This step is the difference between this section and "10". The latter had the interaction between the instances going exclusively via the server, after Bob's device had scanned the barcode in step (2). Accordingly, step (5) is also labelled "direct" in FIG. 8.

In this direct interaction, it is likely that Bob Device 82 will occasionally still make a connection to XYZ Server 83; perhaps to store state information.

9: Use Case=Add Watcher (E-Sports)

This case of adding a user in the previous section can also be applied to the case of adding a watcher described in Section 4 of submission "10". Where Jane runs her app and Bob nearby wants to use his mobile device to watch her play. We end up with FIG. 8. Here, Bob's device might get data about Jane's position, directly from her device 81 via the (5) step. Where her device would modify the data so that what Bob sees is read only. He can see but not alter her position by sending commands to the server.

10: Collision, Audio or Bluetooth Instead of Barcode

In submission "10", we described how a collision between 2 mobile devices could transfer a deep link from one to the other. Likewise "10" explained how one device could play an audio ("chirp") that encoded an identifier of a deep link, and the other device could decode it and get the deep link. In both cases, the 2 devices subsequently interact in a multiuser fashion, via the app server that each instance of the app was assumed to talk to.

In the current submission, we extend that to where this subsequent interaction can be done in part (or mostly or entirely) by the app instances talking to each other directly. Because the deep link is assumed to have the address of the device that made the link.

Refer to FIG. 8. The item (2) QR 85 is replaced by a "collision" or "audio" item. This item necessitates a new item in the figure. A collision server or audio server. Jane XYZ 81 sends the deep link that it made to this server. The server makes an identifier (like a hash) of the deep link and stores both in the server. The identifier is returned to Jane XYZ 81. The latter collides with Bob Device 82. Or it makes an audio of the identifier and plays it. Bob Device 82 uses its collision data from its sensors, or it records the audio, to get the identifier and ask the server. Which returns the deep link to Bob Device 82.

See FIG. 9. It is a flow chart of different ways for a mobile device to get a deep link. The top decision is whether to use a sensor in the device or to use a browser or app. For the latter 2. one way could be to read an email containing a deep link. Another would be to go to a lobby in a web page or app, showing other users and their deep links.

If a sensor is used, there are several choices. One is to use a camera. The camera might scan a barcode. Two choices of barcodes are shown—QR and Data Matrix. For QR, the owner of the base technology is shown—Toyota Corp. Other ways of using the camera are possible and are not shown. For example, Optical Character Recognition can be used to scan a deep link that is written out as hardcopy or on an electronic screen, Another sensor is a microphone. This can record an audio. One example is the Chirp method, owned by University College London.

Another sensor is the accelerometer. In tandem with using GPS (not shown in the figure), there are US patents by Google Corp, that define an example method.

Another way to wirelessly transfer a deep link between two nearby devices is via Bluetooth. One device acts as a Bluetooth transmitter, often called a beacon. The second device has a Bluetooth receiver. Often the second device might be a mobile device. While the first device could be a mobile device or a statically located transmitter.

FIG. 9 also allows for the possibilities of other sensors.

11: Interface

The end of Section 1 discussed FIG. 3 and how there could be different app servers for a given app identifier. There is another reason. Section 1 described a deep link as having an app id. A different use is where this id is the identifier of an interface or Application Programming Interface (API) or Web Service. This interface or rather the documentation for it, can describe a set of programmatic calls to it. Different companies can write very different apps that use this interface.

So FIG. 4 and the part of Section 1 that explains it, can be extended. The Deep Linker on the mobile device might have other criteria, to let it or its user pick between different apps returned by the search engine, that are all associated with the interface id in the deep link.

12: Bypass Ad Blocker

Consider FIG. 10. It shows 2 users and their devices. There is Jane device 101 and Bob device 106. They interact via 2 instances of the same app. One instance is App 102 and the other is App 107. For simplicity, we label the instances as such. The instances also communicate with their server, App Server 104. We call the interaction between App 102 and the server to be Control 101, and the interaction between App 107 and the server to be Control 102.

The instances also interact directly with each other, shown as Direct 100. Each instance knows the address of the other. How this was done might have been by using the deep link in the ways described in the earlier sections. Or by any other means. One example of the latter is where no explicit deep link was used. Instead, the instances started up and connected to App Server 104. The server then told each instance of the other's address.

Note that "Direct 100" simply stands for any communication from App 102 to App 107, where App 102 sends a message packet with the destination address of App 107 and a source address of App 102. And similarly for any communication from App 107 to App 102, where App 107 sends a message packet with the destination address of App 102, and a source address of App 107.

This section discusses the case where the apps want to show ads from Ad Server 103. The problem is that Jane's device connects to the network via a network provider that runs Blocker 105. This runs outside Jane's device. Though in some variants, it might run on her device, or it might have a part that runs on her device. It has various rules that it applies against traffic coming from elsewhere on the network, with a destination of her device. Possibly it might also filter against messages sent from Jane device 101 to the rest of the network.

One simple and very heavily used rule is to apply a blacklist or whitelist of domain names and raw addresses against the source fields of a header in a network packet. A common elaboration is to use deep packet inspection and apply the lists against links in the bodies of packets. The former rule is far faster to apply. While if the packet body has some encryption, the latter rule might not work or be computationally infeasible.

Note that some links in the bodies of packets might point back to the address of Ad Server 103. So if the Blocker can access the plaintext of the packet bodies, then, say, it parses to find links. Where for example, the links might start with "http://" or "https://". Finding a link, it parses the link to get the address. It can check the address against its blacklist. If the address of a link in the blacklist, then the Blocker can decide to block the packet.

Ad 108 coming from Ad Server 103 will then be blocked from arriving at Jane device 101. This is shown in FIG. 10 by the arrow with the label "Ad 108 (blocked)". This covers the cases where the ad would appear inside App 102 or in a separate window on Jane device 101.

Blocker 105 thus far acts against messages going to Jane device 101. It might also block messages going from Jane device 101 to other addresses on the network.

Now suppose Bob device 106 is not filtered by Blocker 105 for messages going to this device from most source addresses on the network. Perhaps he accesses the network via a WiFi provider that does not have that ad blocker. Whereas Jane could be using her phone wireless provider, which is running Blocker 105. Another reason is that Bob device 106 is using a different phone wireless provider, which is not running Blocker 105. Or perhaps Bob's provider is using a different ad blocker, which does not have Ad Server 103 on its blacklist. Jane and Bob could be in different regions, with different wireless providers, for example.

Suppose App Server 104 discovers by whatever means, that ads from Ad Server 103 are not getting through to Jane device 101. For example, if the ads are meant to show up inside the window/s of App 102, then the latter can have means encoded to detect this and tell App Server 104. In general, App 102 might not know what is meant to be shown in its windows as ads; only that some are not appearing. But when App Server 104 finds out, it can synchronise the time when this was happening against the knowledge that Ad Server 103 was meant to show ads on Jane's device at that time.

One solution is for App Server 104 to get the ads from Ad Server 103, and then retransmit from App Server 104, to pass through the ad blocker. The unlabelled connection between the servers in FIG. 10 can be used to get these ads. A problem is that this involves greater use of computer memory, disk, CPU and bandwidth on App Server 104.

Our solution is for App Server 104 to ask Ad Server 103 to send Ad 108 to App 107 on Bob's device. By earlier assumption, this ad will get through to App 107. Note a key nuance. Ad 108 might indeed be shown on Bob device 106, either inside App 107 or in its own window. But in both cases, a copy of the ad needs to go directly to App 107. The latter is told, via Control 102, to send the ad via Direct 100 to Jane device 101. Control 102 can send a deep link of App 102 to App 107, if App 107 does not already know this.

A variant is where App Server 104 does not ask Ad Server 103. Instead, App Server 104 simply asks App 107, via Control 102, to make a copy of any ad it gets and forward this copy to App 102, via Direct 100.

Blocker 105 is unlikely to have Bob device 106's address in its blacklist. Why? Suppose his address is assigned dynamically (via perhaps DHCP as an example). This can be done by his network provider, which temporarily gives him a network address out of a group of numbers owned by the provider. In general, there is no reason why that number should be on the ad blocker's blacklist. The number will over time have been used by various mobile devices for various activities. Whereas an address on the blacklist would likely be of an ad server that the maker of the blacklist has deemed undesirable. And the address would have been used over a long period by the ad server as one of its domains.

So packets from App 107 that have Bob device 106's address in the source header will not trigger blocking.

But if Blocker 105 can access the plaintext of the bodies of packets that App 107 sends to App 102, then it might apply its blacklist against links it finds in the plaintext. Thus App 107 cannot simply send Ad 108 to App 102 as plaintext. App 107 can send it encrypted. Or App 107 sends Ad 108 as plaintext, where App 107 first alters the links, to point back to App 107. This requires App 107 to listen at some port when those links are picked by App 102. Then when App 107 gets such a query, it relays this to Ad Server 103.

A variant is App 107 rewriting the links in Ad 108 to point to App Server 104. But as earlier this adds to the load on App Server 104. Or App 107 can rewrite the links to point to another instance of the app running on another device. The latter instance would then relay the message to Ad Server 103.

On Jane device 101, the ad might appear inside App 102 or in its own window. The latter might not be possible in some cases, where the security on Jane device 101 would prohibit it. Related to this is a feature of FIG. 10. It shows the link Direct 100 making a connection to App 102. Here, the ad would likely appear inside App 102. But if App 107 could send the ad to appear in its own window on Jane device 101, the Direct 100 connection (at least for this content) can be imagined not to "touch" App 102. For simplicity in the figure, this is not shown.

Suppose App 107 sent Ad 108 as an encrypted communication to App 102. Where the Ad 108 (once decrypted) is the same as the Ad 108 that came from Ad Server 103. So Ad 108 gets to App 102 which decrypts it and shows it. Now suppose a link in Ad 108 is picked, where the link goes back to Ad Server 103. If Blocker 105 also checks outgoing messages from Jane device 101, to filter against the destination address in the packet header, then picking the link on that device will not reach Ad Server 103.

To avoid this, then as for an unencrypted communication from App 107 to App 102, Ad 108 can have its links rewritten to point back to App 107. However in this case, one implementation can omit any encryption of Ad 108 from App 107 to App 102, if the plaintext message with links suitably altered can get through. Reduces the computational effort by both devices, which reduces their power consumption.

Because an ad can have substantial content, this section's method avoids App Server 104 having to bear the cost of effectively hosting the ad.

One drawback is that Bob device 106 might have extra load. But Ad 108 might also be shown on his device. So the incremental cost to his device of extra bandwidth, computation and energy is minimal (hopefully).

Suppose that the Direct 100 connection was made via a deep link. The above discussion holds whether the deep link was made by Jane's device or Bob's device.

Now suppose Jane uses her app to interact with more than one other user. We assume that all are using instances of a given app. As before, suppose that the Blocker blocks ads from Ad Server 103 to her. And App Server is aware of this. Likewise, App Server knows that more than one of the other users can get ads from Ad Server. For reasons of wanting ad revenue, App Server wants Jane to get ads.

One scenario is that App Server picks one of the users who can get ads to relay the ads to Jane's device. This might involve rewriting any links in the ad, as described earlier. But how to pick a user?

One method is that the App Server finds a user closest to Jane, using whatever location information it has about the users. To reduce any delays in sending the ad from that user to Jane.

Another method is to load balance amongst users, to distribute the load and the power consumption in this ad relaying as evenly as possible. So for some period of time during which Jane is active, the ads go via Bob. Then perhaps for an equal amount of time, the ads go via Dinesh, then later via Laura. Then, if Jane and the other users are still active, the cycle repeats. This can be modified to handle the case where users join or leave the multiuser app interaction, So a new user who later joins, and who is not ad blocked, might have her app instance relay ads to Jane.

Another method is to let, say, Dinesh's instance of the app take the ads from Ad Server and relay to Jane, and to get and relay any messages from her if she picks a link in an ad. His instance is compensated in some manner for doing this. The compensation can vary. If the app is a game, he might get extra currency (if the game has currency of course). If the game is a fantasy game, he might get extra magic healing potion, for example.

Different types of payment might be possible. And the app might be able to choose between these.

Of the eligible users, each instance of the app might "bid" with the App Server, by telling what amount or type of payment the instance wants. Thus the instance willing to do this relaying for the minimum compensation gets the task.

Suppose the App Server makes some decision as to which user is to relay ads to Jane. That user's app instance might not know Jane's address. While this is a multiuser app, the users do not necessarily know each other's address. Or even if the chosen instance knows the addresses of several users, it does not necessarily know the address of Jane's instance. In general, this could be true, because for n users, it might be infeasible and bad app structure for each of the n users to have the addresses of the other n−1 users. The App Server could make a deep link with her address, possibly including the port at which her app listens for the ad. Equivalently, Jane's app could do this and send the deep link to the App Server. The App Server sends the deep link (however it was made) to the chosen user's app. The latter now knows where to send the ads.

Now step back to an earlier point in the interaction between Jane and other users of the app. Jane started the app. But her instance does not yet know of other users. It contacts the App Server and goes to a lobby page, showing other users who are looking for more users. We say "page" as in web page. Within her app, when it gets data from the App Server, there is an equivalent data structure and affiliated graphical means by which it can be shown on Jane's app so that this can also be considered to be a "page" or screen or a window within the app.

The users in the lobby might be listed in groups. There could be one listing for Bob, Dinesh and Laura, who are assumed to already exist as one group, and they want or need another user. The listing for this group could show how many are currently in the group (eg. 3). The listings might be sorted or filtered to preferentially show groups with at least one user whose app can get ads from Ad Server without being blocked. So that Jane's app will be able to get ads via relaying.

This could involve when Jane's app started, that there was a calibration step. When her app contacts the App Server, the latter might now send her address to the Ad Server. The latter tries to send an ad (or test signal) to Jane's app. If her app cannot detect this ad, then she is blocked from it. There might be other tests.

For example, on an earlier use by Jane of the app, it was found that her device was blocked from the Ad Server. This result can be stored in her app or on the App Server. The next time a new instance of the app contacts the App Server, the latter does not have to do other steps. It can assume that blocking will happen.

This assumption can fail. Jane is using a mobile device. She might move temporarily to a different region and access the network via a different wireless provider, which does not use an ad blocker that has the Ad Server in its blacklist. Or which uses other filtering methods that will pass ads from the Ad Server. Or Jane might access the network via a WiFi hot spot that is not using an ad blocker. So in this case, it would be useful if her app could detect this.

One way is that when the app starts, it has some record of how her device connects to the network. Via her wireless provider or some other wireless provider, or via a hot spot. So the app can detect a new access means, and then tell the App Server this. Alternately, or in parallel, the App Server could record whatever data it can access about each session when Jane's app contacts, and about which network provider is used.

Assume now that when Jane's app contacts the App Server, the latter knows or believes that the app is blocked from the Ad Server. The lobby could show 2 types of groups. One type can relay ads to her app. The other type cannot; it has no users able to get ads from the Ad Server. If Jane picks a group from the second type, she might have to pay the App Server, which charges this in lieu of foregone ad revenue from her. If she picks a group from the first type, she plays for free or for a discount, because the App Server gets some ad revenue.

Thus far we assumed that the user able to relay ads to Jane's app was using an instance of the same app. A variant is where the user, Bob, runs a different app. The latter app might be made by the App Server, who made Jane's app. One use (or even the main use) of Bob's app is to relay of ads from the Ad Server. His app can get these ads without being blocked by the Blocker. Bob's app is compensated by the App Server for doing this. Or the App Server company might employ people like Bob to deploy these relays.

Jane's app contacts the App Server. If the latter thinks the Blocker will block ads from Ad Server to her app, it tells Bob's app to relay, giving it a deep link to Jane's app. In this case, there is no need for the lobby page to show the 2 types of groups.

Bob's device does not need to be mobile. A variant is for the App Server to have several such devices at fixed locations in a region. When Jane's app contacts the App Server, it can find the closest relay device and send it a deep link of her app.

Given the existence of Bob's device or of non-mobile devices run by the App Server that can relay ads without being blocked, a variant of this section is where the app is a single user app. When Jane runs the app, she never interacts with other users of the app. In FIG. 10, App 107 is now an instance of an app that is not the same as the app referred to by App 102. App 107 can be a special purpose "ad relayer" app.

13: Multicast

Now suppose there is no ad blocker. Earlier we described how a user, e.g. Bob, could get an ad from the Ad Server, that his instance might show and also relay to Jane's instance. His instance would get a deep link to Jane's instance, and use the deep link (or a part thereof) to relay. This is a type of multicasting. It can be more efficient to send a copy of an ad to one device. The device shows the ad in an instance of the app running on itself (or the ad appears in its own window), and the instance also relays it to other instances on other devices. The efficiency could be measured by less overall use of one or more of bandwidth, computation and energy across all the instances of the app on the different devices and on the ad server. Principally, the major saving might be on the ad server.

Deep links can be made by the instances themselves, or by the app server. Bob's instance gets the deep links, possibly from the app server.

If there is no ad blocker, there would be no need for the relay device to rewrite the ad, to have links point back to itself instead of the ad blocker. And the ad might be transmitted as cleartext between Bob's device and the other devices.

14: Deep Link and Cookie

This section describes how to incorporate cookies with mobile apps. There is a major current problem with mobile apps. Cookies are not very useful with them, unlike where cookies are used with web browsers. The gist of this section is to put the cookie into the deep link. And then use this to detect or make a social network when the deep link is passed from one (often mobile) device to another (often mobile) device.

See FIG. 11. There is a user Bob with his mobile device, Bob device 1102. We assume that at some earlier time, Bob has installed and run an app, where the app was downloaded from an app store or from App Server 1104. For simplicity in FIG. 11, we omit the app store. During the running, the app called Ad Server 1103 to show ads on Bob device 1102. Ad Server 1103 downloaded one or more ads, as the app is run. Thus far, this is the prior art.

For clarity in this section, assume there is no ad blocker.

Ad Server 1103 detected that Bob device 1102, or the instance of the app on that device, was hitting it for the first time. Ad Server 1103 made a pseudorandom bit sequence, BobCookie, and downloaded it to Bob device 1102. Ad Server 1103 in its permanent storage records BobCookie and the network address of Bob device 1102, and other related information. Like what ads went to the device. Like an id of the app. Like an id of the app instance, if such is available from asking the app instance. Like any properties of Bob device 1102 that it can get.

BobCookie is the equivalent of a cookie used by conventional web browsers, typically running on desktop computers. Above, we described BobCookie as a pseudorandom bit sequence. One variant is where it might be a non-random bit sequence. For example, it might be a word like "jingle" or "Timothy", which are clearly non-random.

The app on Bob's device stored BobCookie in permanent storage. So after the instance stopped running, and so long as the app had not been deleted from the device, BobCookie is still present. Typically, the storage area is sandboxed to be only written to and read from by an instance of the app. Other apps cannot access it, as a security measure. Else a rogue app might partake data made by other apps.

In FIG. 11, Bob device 1102 would most likely also contact App Server 1104, as part of the usual behaviour of most apps. This is shown by the bidirectional arrow between the entities.

Now suppose Jane with her device, Jane device 1101, wants to run the app for the first time, where the app is not present on her device. The app is single user or multiuser. In the label for FIG. 11, the "first time user" refers primarily to Jane and not Bob. She gets a deep link from Bob via any means, including several ways described earlier.

For example, suppose she is near Bob. His app makes a deep link. If the app is multiuser, the deep link can have the address of his instance of the app. If the app is single user, and the context or intent is that Jane wants to run an instance of the app, with no further interaction with Bob, then the deep link might omit the address of his instance.

What is new in this section is that the app adds BobCookie into the deep link as an extra argument. Bob converts the app to a barcode, and shows it on the screen of his device. Jane scans and decodes it into the deep link. Or Bob's device uploads the deep link to an audio server, and gets an audio which it plays. Jane's device decodes and gets the deep link. Or Bob's device uploads the deep link to a collision server, and collides his device with Jane's device. The latter server gives her device the deep link.

We indicate this as the arrow going from Bob device 1102 to Jane device 1101, labelled "DL(BobCookie) [1]".

(Another method is for multiuser apps, when Bob runs the app and registers himself via a deep link on a lobby page at App Server 1104. Jane uses her mobile browser to go to the page and picks Bob. This is not shown in FIG. 11, where it would correspond to an arrow going from App Server 1004 to Jane device 1101. And instead of the labels DL(BobCookie) [1] and DL(BobCookie) [2], there would just be one label DL(BobCookie) [1]. And the other labels for the arrows would be renumbered appropriately. For simplicity, this is not shown in FIG. 11, but is a straightforward modification.)

Once Jane device 1101 has the deep link, by whatever means, her Deep Linker uses it to install the app. This is shown as the arrow DL(BobCookie) [2] (where the "[2]" indicates a step 2) which goes to App Server 1104. The latter downloads App [3] (where the "[3]" indicates a step 3), which Jane device 1101 installs and runs.

Her app instance asks Ad Server 1103 for ads. This query uploads BobCookie [4], which her app extracted from DL(BobCookie). Ad Server 1103 detects that Jane's instance is asking it for the first time. For example, there can be a flag in the query set by the new instance to indicate this. And Ad Server 1103 has BobCookie. This tells it that BobCookie refers to another user.

Ad Server 1103 makes a new pseudorandom bit sequence, JaneCookie. In its permanent storage, it associates this with the network address of Jane device 1101 and other information, just as it did when making BobCookie for Bob device 1102. Ad Server 1103 downloads JaneCookie and an ad in step [5] to Jane device 1101. Jane's app shows the ad and stores JaneCookie in the app's storage area on the device, just as Bob's app stored BobCookie on his device.

Importantly, Ad Server 1103 makes an internal link in its database between JaneCookie and BobCookie. So just as cookies can be used in conventional web pages to follow the behaviour of a user across different websites, this link, transferred in a deep link, lets the Ad Server make a social network of users. This can be of great value to advertisers, who always want more information about users.

If we think of JaneCookie as representing a user Jane as a node in a social graph, and likewise BobCookie as another node, representing Bob, then the deep link defines a directed edge from Bob to Jane.

One elaboration when the deep link was made by Bob's instance of the app, or when the deep link was decoded on Jane's device, is that an extra parameter was added to the deep link, to indicate the method of transmission between the devices. This is extra information that Ad Server 1103 can choose to record.

Now consider FIG. 12. Jane and Bob are both assumed to have installed and run an app (the same app) at some time in the past. No prior association between them is assumed. Jane has JaneCookie on her device and Bob has BobCookie on his device. Ad Server 1203 has stored those cookies and related data in its storage, with no links between these data.

Jane and Bob want to interact using the app. Perhaps it is a multiplayer app. Or perhaps it is a single player app where, say, Bob is the player and Jane wants to watch him on her device. Bob makes a deep link DL(BobCookie) that includes BobCookie as an argument. It is transmitted to Jane device 1201 using methods described earlier. Jane and Bob could be near each other. Or they could be far from each other. Where Jane goes to a lobby web page from the App Server. Or Jane starts her app, and it goes to the App Server and the app then shows the data in an equivalent "page" inside the app. This page has a deep link for Bob.

For simplicity, in FIG. 12 we omitted the App Server. It should be considered implicitly present.

Jane device 1201 gets DL(BobCookie) for its instance of the app. Her app uses the deep link to interact with Bob's instance. Also, it extracts BobCookie and contacts Ad Server 1203, sending it both JaneCookie and BobCookie in step [2]. There would be some way for Ad Server 1203 to distinguish that JaneCookie refers to Jane device 1201 and BobCookie refers to another device or user. A simple way is that in the data sent from Jane device 1201 to Ad Server 1203, the first cookie always refers to the sending device (there might only be one cookie). While if another cookie is sent in the data, it refers to another device or user. Ad Server 1203 downloads an Ad in step [3] to Jane device 1201.

Ad Server 1203 also makes an internal connection in its database between the data pointed to by JaneCookie and BobCookie.

Now consider what happens when we have 3 users interacting via 2 apps. This shows how an ad server can use cookies embedded in deep links to draw a simple social network graph. See FIG. 13. One app is MadCow. Another app is FatDog. The apps are assumed to be made by different companies. Each company has its own app server. And the companies do not share data.

Both apps use ads coming from Ad Server 1304. There is Jane with her device, Jane device 1301. And Bob with his device, Bob device 1302. And Doris with her device, Doris device 1303.

Jane and Bob have interacted using MadCow app. This involved Bob's app making the deep link DL(BobCookie) and sending it to Jane's MadCow, using the steps described above in this section. In Bob device 1302 is shown the storage used by MadCow. It holds BobCookie, which an instance of MadCow got from Ad Server 1304. In Jane device 1301 is shown the storage used by MadCow. It holds JaneCookie and BobCookie.

Now consider the app FatDog. Doris has run it and gotten DorisCookie from Ad Server 1304. In her device is the FatDog storage area, holding DorisCookie. Jane has interacted with Doris using this app. Where Doris' instance made the deep link DL(DorisCookie) which embeds DorisCookie. It was sent to Jane's instance of FatDog. On Jane device 1301, the FatDog storage area holds JaneCookie and DorisCookie.

For clarity, FIG. 13 does not show any explicit interactions between Ad Server 1304 and (Doris device 1303 or Bob device 1302). Those interactions occur and are implicit in the figure.

Suppose without loss of generality that before ever running FatDog, Jane had run MadCow. So Ad Server 1304 made JaneCookie. Later, Jane runs FatDog. When it contacts Ad Server 1304, the latter by some means identified successfully that the mobile device making this query was the one that earlier had gotten JaneCookie. So Ad Server 1304 instead of making a new cookie for FatDog, associates the pre-existing JaneCookie with the query from her FatDog instance. The Ad Server 1304 downloads JaneCookie, which FatDog puts in its storage area, as indicated in FIG. 13.

However, during the query from Jane's FatDog instance to Ad Server 1304, the query uploaded DorisCookie. This is indicated as the arrow from the FatDog storage in Jane device 1301 to Ad Server 1304.

FIG. 14 shows the resulting social network that Ad Server 1304 derives from FIG. 13. There is a graph with 3 nodes. Each node represents a user with her device. Though for simplicity, we just write the user names, Jane, Bob and Doris. There are directed links. One from Doris to Jane is labelled FatDog, because this is the app that both used in a joint interaction. And the direction of the arrow is because the deep link was made by Doris' instance of FatDog. Similarly, there is a directed link from Bob to Jane, labelled MadCow.

There could be more data in the edges. For example, an edge might have information about how the deep link was transmitted. The edge could have time information. Like when the interaction started and how long it was. The edge might have location information about where the users where when interacting. The users might be next to each other, or non-local.

With more data about more users interacting via more apps, the potential clearly exists for extrapolating the simple graph of FIG. 14 into an intricate graph useful to advertisers and app makers.

In general, the graph made need not have all the edges be directed. There might be interactions via deep links (or by other means not involving deep links) where the interaction was not initiated by any of the nodes connected to the edge. Or at least where the ad server does not have any information to the contrary.

Note in FIGS. 13 and 14 that the app companies cannot make the associations of the graph in FIG. 14. The MadCow company only knows that Jane and Bob use its app. The FatDog company only knows that Jane and Doris use its app. The ad server can draw a bigger graph.

One use of a social network graph like FIG. 14 is for the ad server to figure out which users have many outgoing edges/links. These users can be acting as sources or disseminators of app activity. By making others users aware of apps that they do not have, where these users then install and hopefully run the apps. Perhaps the "source" users are more gregarious (more social) and are able to initiate actions that encourage to get the apps. The source users are valuable to the ad server, because they ultimately let more ads be shown. The ad server might make special offers to the source users.

A refinement is where a source user is such because she plays many others in multiuser apps. Where the users tend to already have installed those apps. Remember that the value of an app user is not just in installing the app, but in actually playing it as much as possible. So that the ad server can serve it many ads and the app server can get as much revenue by other means.

A utility of this section is that the ad server can get enough data to identify the source users and to at least roughly classify them into these 2 types.

The source users can be valuable to app companies, who likely might not know of these from their own data. The ad server could sell information about the source users to appropriate app companies. An app company who gets contact information about a source user could offer her early access to a new app that the company is releasing soon. Or the app company could offer her discounted or free access to some or all of its apps, in the hope that she will like some of these and use them and publicise them with others.

15: Other Remarks

Thus far, the uses described were mostly homogeneous. There were 2 (or sometimes more) instances of the same app, and these ran on mobile devices. Here, we consider the case where one instance might run on an iPhone, for example, and another instance to run on an Android device, to still be homogeneous. An app company can make two versions of an app—for those platforms. The binaries are different, but the company would strive to make the functionality and user experience as similar as possible. To maximise its market appeal.

Another attraction of using deep links to tie 2 instances of the same app is that only one company is involved. Simpler operationally to make any code changes.

For heterogeneous uses—we have an (instance of) an app making a reflexive deep link, and an (instance of) a different app on a different device, getting the deep link. Much of the prior art work on deep links has been focused on this case. We suggest that without contradicting any of that work, there is value in homogeneous use of deep links.

I claim:

1. A method of a mobile device Alpha on a network; where Alpha has a deep link; where the deep link has an identifier of a mobile app; where the deep link has an address on the network of a remote instance of the mobile app; where if the mobile app is not installed on Alpha, Alpha installs the mobile app from an app server; where Alpha runs an instance Gamma of the mobile app; where Gamma receives the address as input; where Gamma interacts with the remote instance; where Gamma gets an ad from a server; where Gamma records sources in links in the ad; where Gamma alters links in the ad to refer to the address of Alpha and a port number; where Gamma forwards the altered ad to the remote instance; where Gamma listens on the network at the port number; where Gamma gets a message from the address of the remote instance; where Gamma forwards the message to a source.

2. The method of claim 1, where Gamma gets a message Phi from the source; where Gamma relays Phi to the remote instance.

* * * * *